(12) United States Patent
Horvitz

(10) Patent No.: US 8,126,641 B2
(45) Date of Patent: Feb. 28, 2012

(54) ROUTE PLANNING WITH CONTINGENCIES

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/428,181

(22) Filed: Jun. 30, 2006

(65) Prior Publication Data

US 2008/0004802 A1 Jan. 3, 2008

(51) Int. Cl.
*G01C 21/30* (2006.01)

(52) U.S. Cl. ............... 701/207; 701/202; 340/995.19

(58) Field of Classification Search ....... 701/1, 117–122, 701/200–202, 207–210, 204; 340/995.13, 340/995.19–995.27
See application file for complete search history.

(56) References Cited

U.S. PATENT DOCUMENTS

| | | | |
|---|---|---|---|
| 5,444,442 A | 8/1995 | Sadakata et al. | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,606,695 A | 2/1997 | Dworzecki | |
| 5,611,050 A | 3/1997 | Theimer et al. | |
| 5,812,069 A | 9/1998 | Albrecht et al. | |
| 5,812,865 A | 9/1998 | Theimer et al. | |
| 5,822,712 A | 10/1998 | Olsson | |
| 5,878,368 A * | 3/1999 | DeGraaf ................ | 701/209 |
| 5,933,094 A | 8/1999 | Goss et al. | |
| 5,987,374 A | 11/1999 | Akutsu et al. | |
| 6,047,260 A | 4/2000 | Levinson | |
| 6,124,826 A | 9/2000 | Garthwaite et al. | |
| 6,175,803 B1 * | 1/2001 | Chowanic et al. ........... | 701/209 |
| 6,216,086 B1 * | 4/2001 | Seymour et al. ............. | 701/202 |
| 6,236,932 B1 | 5/2001 | Fastenrath | |
| 6,240,364 B1 | 5/2001 | Kerner et al. | |
| 6,263,277 B1 * | 7/2001 | Tanimoto et al. ............ | 701/209 |
| 6,298,302 B2 | 10/2001 | Walgers et al. | |
| 6,314,365 B1 | 11/2001 | Smith | |
| 6,317,684 B1 * | 11/2001 | Roeseler et al. ............. | 701/202 |
| 6,353,398 B1 | 3/2002 | Amin et al. | |
| 6,381,533 B1 | 4/2002 | Crane et al. | |
| 6,401,027 B1 | 6/2002 | Xu et al. | |
| 6,401,038 B2 | 6/2002 | Gia | |
| 6,445,968 B1 | 9/2002 | Jalla | |
| 6,466,232 B1 | 10/2002 | Newell et al. | |

(Continued)

FOREIGN PATENT DOCUMENTS

JP 11023307 * 1/1999

(Continued)

OTHER PUBLICATIONS

Andy Harter, et al., A Distributed Location System for the Active Office, IEEE Network, 1994, pp. 62-70.

(Continued)

*Primary Examiner* — Mark Hellner
*Assistant Examiner* — Helal A Algahaim
(74) *Attorney, Agent, or Firm* — Wolf, Greenfield & Sacks, P.C.

(57) ABSTRACT

A route planning system comprises a receiver component that receives a request for directions between two points. A route generator component outputs directions between the two points, the directions include a contingency such that an alternate route is provided, a selected route between the two points is dependent upon a user perception at a geographic location that corresponds to the contingency.

20 Claims, 14 Drawing Sheets

U.S. PATENT DOCUMENTS

| | | | |
|---|---|---|---|
| 6,480,783 B1 * | 11/2002 | Myr | 701/117 |
| 6,513,046 B1 | 1/2003 | Abbott, III et al. | |
| 6,549,915 B2 | 4/2003 | Abbott, III et al. | |
| 6,615,133 B2 * | 9/2003 | Moskowitz et al. | 701/209 |
| 6,640,212 B1 | 10/2003 | Rosse | |
| 6,672,506 B2 | 1/2004 | Swartz et al. | |
| 6,721,650 B2 | 4/2004 | Fushiki et al. | |
| 6,741,188 B1 | 5/2004 | Miller et al. | |
| 6,744,383 B1 | 6/2004 | Alfred et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,813,558 B1 | 11/2004 | Lapstun et al. | |
| 6,837,436 B2 | 1/2005 | Swartz et al. | |
| 6,842,877 B2 | 1/2005 | Robarts et al. | |
| 6,882,930 B2 | 4/2005 | Trayford et al. | |
| 6,909,380 B2 | 6/2005 | Brooke | |
| 6,970,131 B2 | 11/2005 | Percy et al. | |
| 6,983,139 B2 | 1/2006 | Dowling et al. | |
| 6,985,810 B2 | 1/2006 | Moitra et al. | |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,171,378 B2 | 1/2007 | Petrovich et al. | |
| 7,195,157 B2 | 3/2007 | Swartz et al. | |
| 7,385,501 B2 | 6/2008 | Miller et al. | |
| 7,580,792 B1 * | 8/2009 | Croak et al. | 701/209 |
| 2001/0029425 A1 | 10/2001 | Myr | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0010610 A1 | 1/2002 | Jacobs et al. | |
| 2002/0010615 A1 | 1/2002 | Jacobs | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0103693 A1 | 8/2002 | Bayer et al. | |
| 2003/0018521 A1 | 1/2003 | Kraft et al. | |
| 2003/0046158 A1 | 3/2003 | Kratky | |
| 2003/0046401 A1 | 3/2003 | Abbott et al. | |
| 2003/0060977 A1 * | 3/2003 | Jijina et al. | 701/210 |
| 2003/0065442 A1 | 4/2003 | Touney | |
| 2003/0154476 A1 | 8/2003 | Abbott, III et al. | |
| 2003/0182052 A1 | 9/2003 | DeLorme et al. | |
| 2004/0059622 A1 | 3/2004 | Mueller | |
| 2004/0088106 A1 * | 5/2004 | Omi | 701/200 |
| 2004/0181495 A1 | 9/2004 | Grush | |
| 2004/0192351 A1 | 9/2004 | Duncan | |
| 2004/0201500 A1 | 10/2004 | Miller et al. | |
| 2004/0225437 A1 * | 11/2004 | Endo et al. | 701/209 |
| 2004/0249568 A1 * | 12/2004 | Endo et al. | 701/209 |
| 2005/0004757 A1 | 1/2005 | Neeman et al. | |
| 2005/0010360 A1 * | 1/2005 | Nagase et al. | 701/210 |
| 2005/0027444 A1 | 2/2005 | Kim | |
| 2005/0034078 A1 | 2/2005 | Abbott et al. | |
| 2005/0038596 A1 | 2/2005 | Yang et al. | |
| 2005/0049765 A1 | 3/2005 | Chetia et al. | |
| 2005/0093720 A1 * | 5/2005 | Yamane et al. | 340/995.13 |
| 2005/0234758 A1 | 10/2005 | Nishi | |
| 2005/0256754 A1 | 11/2005 | Nastacio | |
| 2005/0266858 A1 | 12/2005 | Miller et al. | |
| 2005/0272442 A1 | 12/2005 | Miller et al. | |
| 2005/0288849 A1 | 12/2005 | Rothman et al. | |
| 2006/0019676 A1 | 1/2006 | Miller et al. | |
| 2006/0041379 A1 | 2/2006 | Brulle-Drews | |
| 2006/0055565 A1 * | 3/2006 | Kawamata et al. | 340/995.13 |
| 2006/0106506 A1 * | 5/2006 | Nichols et al. | 701/3 |
| 2006/0106530 A1 * | 5/2006 | Horvitz et al. | 701/117 |
| 2006/0129313 A1 * | 6/2006 | Becker et al. | 701/202 |
| 2006/0247852 A1 * | 11/2006 | Kortge et al. | 701/209 |
| 2007/0021905 A1 * | 1/2007 | Takashima et al. | 701/201 |
| 2008/0090591 A1 | 4/2008 | Miller et al. | |
| 2008/0091537 A1 | 4/2008 | Miller et al. | |
| 2008/0161018 A1 | 7/2008 | Miller et al. | |

FOREIGN PATENT DOCUMENTS

| | | | |
|---|---|---|---|
| JP | 2001021375 | * | 1/2001 |
| WO | 9800787 | | 1/1998 |
| WO | 9854682 | | 12/1998 |
| WO | 0163451 | | 8/2001 |
| WO | 0193070 | | 12/2001 |
| WO | 2004021306 | | 3/2004 |
| WO | 2005036471 | | 4/2005 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, in the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Dissemintiong Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Simon Handley, et al. Learning to Predict the Duration of an Automobile Trip. Proceedings of the Fourth International Conference on Knowledge Discovery and Data Mining. 1998, pp. 1-5, New York.

John Fawcett, et al. Adaptive Routing for Road Traffic. IEEE Computer Graphics and Applications. May/Jun. 2000, pp. 46-53. vol. 20, No. 3.

Toshihiko Oda, et al. Evaluation of Measured Travel Time Utilizing Two-way Communication in UTMS. Third World Congress on Intelligent Transport Systems. 1996. Orlando, Florida.

Karen Zita Haigh, et al. Exploiting Domain Geometry in Analogical Route Planning. Journal of Experimental and Theoretical AI, 1997. pp. 509-541. vol. 9, No. 4.

John Krumm, et al. The Microsoft Multiperson Location Survey. Aug. 2005, pp. 1-4. Microsoft Research.

Lawrence R. Rabiner. A Tutorial on Hidden Markov Models and Selected Applications in Speech Recognition. Proceedings of the IEEE. Feb. 1989. vol. 77, No. 2. pp. 257-286.

Auto Route. http://www.microsoft.com/uk/homepc/autoroute/see/default.mspx. Last accessed on Mar. 1, 2006. 2006 Microsoft Corporation.

Take a Free Trip on Auto-Pilot. http://www.freetrip.com/. Last accessed on Mar. 1, 2006. 2 pgs.

Jeff Kurtz, et al. Map Navigation Experiment. http://www.itl.nist.gov/iaui/vvrg/nist-icv/experiments/mapnav/mapnav.html. Last accessed on Mar. 1, 2006. 3 pgs.

Stefan Edelkamp, et al. Route planning and map inference with global positioning traces. Computer Science in Perspective. 2003. pp. 128-151. Springer-Verlag New York, Inc.

William H. K. Lam. Comparison of two non-parametric models for daily traffic forecasting in Hong Kong. Journal of Forecasting. Feb. 27, 2006. 2 pgs. John Wiley & Sons, Ltd.

Raffaele Bolla. A new model for network traffic forecast based on user's mobility in cellular networks with highway stretches. International Journal of Communication Systems. Sep. 22, 2004. pp. 911-934. vol. 17, Issue 10. John Wiley & Sons, Ltd.

Joao Paulo Barros. Activities as Behaviour Aspects. http://lglwww.epfl.ch/workshops/uml2002/papers/barros.pdf. Last accessed on Mar. 3, 2006. 6 pgs.

K Meister, et al. Generating daily activity schedules for households using Genetic Algorithms. 5th Swiss Transport Research Conference. Mar. 9-11, 2005. 26 pgs. Monte Verità / Ascona.

Has ITS4mobility the capability to ensure reliable operation and realistic prediction of vehicle arrival and/or departure times? http://www.volvo.com/mobilitysystems/global/en-gb/FAQ/RealisticPredictionsArrivals.htm. Last accessed on Mar. 2, 2006.

TriMet Transit Tracker Implementation. Innovations in Public Transit. Jan. 4, 2005. 7 pgs.

Daniel Ashbrook, et al. Enabling Ad{Hoc Collaboration Through Schedule Learning and Prediction. http://www-static.cc.gatech.edu/fac/Thad.Starner/p/031_20_Activity/chi_mobihoc-2002.pdf. Last accessed on Mar. 2, 2006. 4 pgs.

Mattias Östergren, et al. Road Talk: A Roadside Location-Dependent Audio Message System for Car Drivers. Journal of Mobile Multimedia. Feb. 25, 2005. pp. 47-61. vol. 1, No. 1. Rinton Press.

Joseph Schwartz. Microsoft Releases MapPoint 2002. Directions Magazine. Apr. 24, 2001. pp. 1-4. Directions Media. Glencoe, IL.

Oscar Franzese, et al. Traffic Simulation Application to Plan Real-Time Distribution Routes. Proceedings of the 2002 Winter Simulation Conference. 2002. pp. 1214-1218.

B.L. Smith, et al. Meeting Real—Time Traffic Flow Forecasting Requirements with Imprecise Computations. Computer—Aided Civil and Infrastructure Engineering. May 2003. pp. 201-213. vol. 18, No. 3. Blackwell Publishing.

Fastcommute. http://home.earthlink.net/~fastcommute/. Last accesses on Mar. 1, 2006.

\* cited by examiner

ROUTE PLANNING WITH CONTINGENCIES

BACKGROUND

Computer-driven route planning applications are used every day to assist users in locating and navigating to points of interest, such as particular buildings, addresses, and the like. Additionally, in several existent commercial applications users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a city, state, and/or country, proximity of the point of interest to major freeways, proximity of the point of interest to a specific city, and the like. In some applications, satellite images can be utilized to provide users with additional detail regarding a particular geographic location or region. For example, a prospective purchaser of a house can obtain an overhead satellite image of the house, thereby enabling the prospective purchaser to view lines of occupation, proximity of the house to other adjacent houses, and other information that may be pertinent to the user.

Furthermore, conventional computer-implemented mapping applications often include route planning applications that can be utilized to provide users with directions between different locations. Pursuant to an example, a user can provide a route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check-box that enables a user to specify that she wishes to avoid highways. Similarly, a user can inform the route planning application that she wishes to travel on a shortest route or a route that takes a least amount of time (as determined by underlying algorithms). Over the last several years, individuals have grown to increasingly rely on route planning applications to aid them in everything from locating a friend's house to planning cross-country road trips.

Route planning applications are also no longer confined to desktop computers. Rather, several automobiles are now equipped with standard mapping functionality, wherein the automobiles include graphical displays on a console to provide mapping data and directions to a user. Oftentimes, a compact disk or other storage medium that includes data to enable utilization of route-planning functionality must be purchased and loaded prior to use of the route planning application. As road conditions change, such as speed limits, number of lanes, etc., updates can be provided. Automobiles with GPS functionality (or other location identifying functionality) can additionally include real-time directions, wherein directions are provided to users of the automobile while they travel.

These route planners are fairly reliable in connection with details such as posted speed limits, location of one-way streets, and related information. However, conventional applications that include route-planning functionality make assumptions regarding state of roads. With more specificity, today's route planning applications are built around assumptions of constancy and universality, such that optimal routes provided by the applications are independent of time of day, day of week, and detailed user preferences. In actuality, however, these assumptions do not hold. For example, in many instances, a best route between two points during rush hour in a metropolitan area is not an optimal route at midnight between the same two points. Conventional route planning applications, however, do not take such context into account when providing routes for users. Additionally, most of today's drivers do not own devices that are constantly connected to a network. For instance, route planning applications are often used to print out directions and the user reaches a destination by reading from the printout while driving. If an accident or other stoppage occurs on a road segment described in the printout, however, the driver remains forced to wait in traffic (assuming that they are unfamiliar with an area).

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to provision of driving directions to a user, wherein the directions include multiple routes. A selected route is determined through user perceptions where the multiple routes diverge (branch) from one another. Thus, the user acts as a sensor within the traffic system, and an optimal route (with respect to travel time or detailed user preferences) can be provided to the user. Furthermore, users need not be associated with devices that remain connected to a network within the traffic system. Rather, directions can be printed or downloaded to a portable device that does not remain connected and the directions can be followed by the user. At a divergence, the user can select a route to take based upon their perception of current traffic system state, time of day, day of week, and the like.

To facilitate determining the multiple routes (or where to place a point of divergence within a route), a traffic system representation can be accessed, wherein the representation alters as context alters. Pursuant to an example, the traffic system representation can be or include a weighted graph, where nodes represent intersections and edges represent road segments therebetween. The nodes and edges can be weighted, where the weights correspond to average travel speeds associated with intersections and road segments that are represented by the nodes and edges. The weights can then vary as context varies, thus more accurately representing traffic flow within a traffic system. For instance, commuters in a metropolitan area are fully aware that it takes more travel time to travel certain road segments during rush hour when compared to traveling the same road segments at midnight on a weekend. The traffic system representation can be accessed with respect to various contexts, and multiple routes between the same two (provided) points can be determined based at least in part upon the various contexts (e.g., time of day, day of week, weather conditions, . . . ).

In accordance with another aspect, text can be provided to the user relating to points of divergence between alternate routes, wherein the text guides the user with respect to what variable they should be perceiving. Pursuant to a particular example, the user can reach a point of divergence and the next portion of the directions may read "continue east if the road is not congested, or turn south if the road is congested." Thus, a route is selected based upon whether or not the user perceives the road as being congested. Additionally, the user will not become lost during travel, as the alternate routes each lead to the same destination point.

In addition, a number of alternate routes or points of divergence can be limited based upon parameters of a device that will be displaying the directions. For instance, screen size and resolution of a portable device can be analyzed in connection with determining a number of alternate routes or divergences to display. Therefore, for example, a small portable device may not be able to display as many branches to a route as a standard piece of paper.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
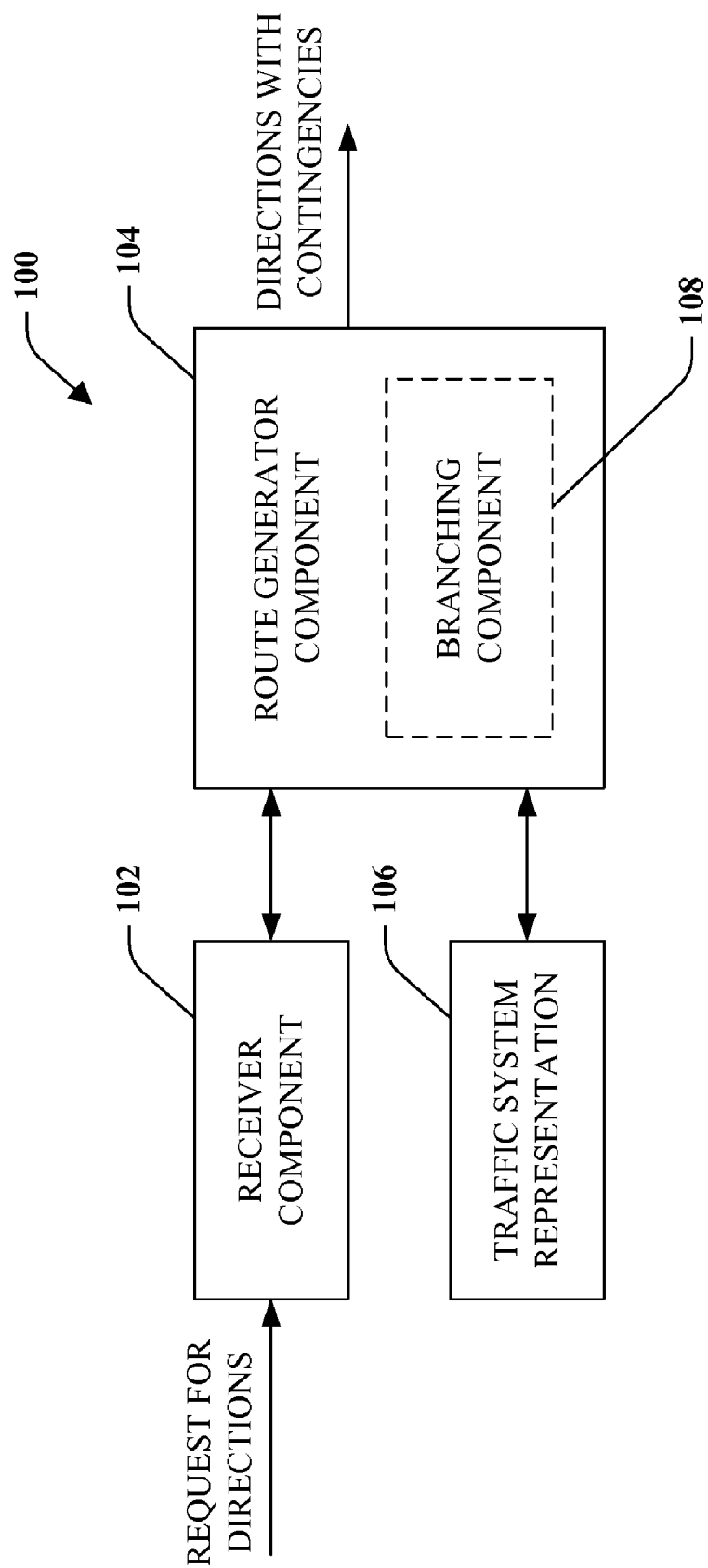
FIG. 1 is a high-level block diagram of a system that can be employed to output directions between two points, wherein the directions include at least one contingency.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, optical disks (e.g., compact disk (CD), digital versatile disk (DVD), . . . ), smart cards, and flash memory devices (e.g. card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Referring now to FIG. 1, a system 100 for outputting driving directions with contingent routes is illustrated. The system 100 can be existent upon a server, distributed across several servers, and/or resident upon a client. The system 100 includes a receiver component 102 that receives a request for driving directions from a user. The request can be received through employment of an Internet browser and a graphical user interface associated therewith. The request can also be received through voice commands provided by way of a microphone or other suitable audio capturing device. The directions include a point of beginning and a point of destination, where such points can be addresses, landmarks and/or monuments, cities, regions, or any other suitable geographic points. In accordance with one aspect, the receiver component 102 can receive a request for directions between multiple points, where the originator of the request does not indicate sequence of travel between the points. The system 100 can be employed to determine directions between points as well as sequence of travel between the points.

The receiver component 102 is communicatively coupled to a route generator component 104 that can output driving directions given the user request. In more detail, the route generator component 104 can access a traffic system representation 106 in connection with outputting directions that include contingencies or branches. This enables the driver to act as a sensor at branches within the driving directions. In a specific example, directions output by the route generator component 104 can include the following: "Enter the freeway. If the freeway is clear at the point of entrance, remain on until exit 95. If the freeway is not free flowing, exit at a next exit." Thus, if the user perceives traffic problems on the freeway, he can follow the branch within the directions that avoids the freeway.

To generate the directions with contingencies, the route generator component 104 can access a traffic system representation 106, which represents a traffic system associated with the request. The traffic system representation 106, for instance, can represent traffic flows within the traffic system given various contexts. Thus, for instance, the traffic system representation 106 can change as time of day, day of week, weather conditions, and the like alter. In a particular example, the traffic system representation 106 can be and/or include a weighted graph, where nodes of the graph represent intersections and edges represent road segments between intersections. The edges and/or nodes can be weighted based at least in part upon sensed travel speeds associated with the road segments and/or intersections given various contexts. As described below, road segments and/or intersections that are not associated with sensed data can be assigned average travel speeds by analyzing sensed travel speeds. Weights can alter given time of day, day of week, weather conditions, and the like. The traffic system representation 106 can also include static data, such as location of roads, location of stop signs and stop lights, areas associated with road segments and/or intersections (e.g., commercial, residential, . . . ), road types of road segments (e.g., two lane, four lane, freeway, . . . ), terrain types, and any other suitable data that can be utilized to represent a traffic system. Different data that can be analyzed in connection with outputting one or more routes and/or predicting traffic flows is described in more detail below.

The route generator component 104 can, for instance, output an optimal route between the two points provided in the request based at least in part upon contextual data. For example, the route generator component 104 can locate a path between the two provided points that is associated with a lowest weight. To locate the optimal path, the route generator component 104 can employ an A star algorithm or any other suitable algorithm. However, an accident or unexpected traffic jam can cause the route initially thought to be optimal to, in actuality, be sub-optimal or against user wishes. A branching component 108 can be employed to locate contingency routes and output such contingency routes to a user. In other words, the route generator component 104 can output branches, such that alternative routes are provided if the user perceives that an incident has occurred that would make the optimal route undesirable. The branching component 108 can determine points within an optimal route to include branches through undertaking a deterministic and/or probabilistic analysis of the traffic system representation 106. For example, the branching component 108 can locate a most probable point of an accident along the optimal route and generate an alternate route from such point. Similarly, if no contextual data is provided with the request for directions (e.g., time of day and day of week that a journey will be taken), the branching component 108 can locate points within the journey where traffic congestion is most likely and can generate an alternate route from that point. A number of branches within a route, for instance, can be pre-determined by a user. Any suitable manner for limiting branches, however, is contemplated and intended to fall under the scope of the hereto-appended claims. Still further, the branching component 108 can determines where to place one or more contingencies based at least in part upon one or more of cost, difficulty, and reliability of evaluating an observation point at a possible contingency point.

Further, the route generator component 104 can be, include, or be associated with a predictive model that can determine a probability distribution over flows given varying contexts. In other words, the route generator component 104 can use partial sensor data (e.g., limited data collected on streets that happen to be traversed at different times by users carrying devices that can aid in tracking location, velocity, and the like) relating to road velocities at different times of day and days of a week to build a model that links sets of contextual and structural information to observations. For instance, information sensed from a traffic arterial system can be learned about to predict traffic flows on side streets. Such prediction can be accomplished through utilization of a predictive model (e.g., within the route generator component 104) that predicts road speeds (on roads and in contexts that have not been observed) through reasoning from properties, both real-time and structural. The route planning component 104 can be utilized to annotate (offline or in real-time) all roads within a traffic system, and updated velocities can be placed within the traffic system representation 106. A route planning system (such as one that uses the A* algorithm, the Dijkstra algorithm, and/or other suitable algorithms) can identify fastest routes based upon contextual cues, structural cues, and/or combinations thereof. Further, a route planning system can account for user preferences (inferred or explicitly defined) in connection with outputting a route to a user. For example, the user may prefer to drive over country roads rather than freeways, even though traversal of the country roads may not provide a fastest route between two points.

Thus, the system 100 (and other systems/methods described herein) can leverage via learning and generalizing of partial sensed information and can link a skeleton of a sensed arterial system to previously unsensed portions of a traffic system. Therefore, the route generator component 104 can fill "holes" in a sensed system by predicting road speeds and expected road speeds (where a probability distribution over speeds is developed).

Still further, the system 100 can output directions over varying contexts. For instance, a user can input when they are planning on beginning travel, and directions or routes can be output to a user that are specific to the provided context (even though all road portions in a route may not be associated with sensed data for the particular context). With still more specificity, predictive models can be built that are tuned to predicting the future versus predictions at a current time. For the near future, current or recently observed contextual information can be observed and used to train for traffic flows in the future. In other words, models can be built that predict state of future flows from data previously observed. For predicting into the far future, contextual features that are currently observed (e.g., current traffic flows) can be effectively ignored, and the system 100 can resort to use of previously collected statistics.

To output contingent directions, the branching component 108 can analyze probability distributions over various road segments located through use of a search algorithm and can locate regions where there is a significant amount of variation. The route generator component 104 can the branching component 108 can work in conjunction to generate a route and contingent routes that are based on one or more aspects of the determined probability distributions. In one example approach, the route generator component 104 and the branching component 108 can generate one or more candidate routes based at least in part upon expected or average traffic flows for a specified context or all contexts. If broader contexts are provided to the aforementioned components 104 and 108, more variation will take place throughout a system. However, an individual desiring directions may not know when they are leaving and will want directions ahead of time that they can use generically. Alternatively, the user can request directions at a specific time, thereby narrowing contexts and likely reducing variation in the probability distributions.

Still further, the route generator component 104 and the branching component 108 can take into consideration user risk preferences and/or cases that may be seen with a particular probability. For instance, routes can be designed for individuals with different risk preferences. In a detailed example, a user may state that they are willing to risk a traffic jam if the probability of such jam is below a threshold. The system 100 can then report a route with a probability distribution over arrival times.

Additionally or alternatively, the system 100 can output a route together with observations a user may find while traversing the route together with contingencies for taking special routing actions given certain observations. The system 100 can also provide the probabilities for each of the observations (given a particular context) and expected times for end-to-end routes with respect to each of the contingencies.

Still further, given a set of candidate routes that are generated on a consideration of some statistic of predicted velocities (such as means), a system can identify contingency plans for each of the routes in a variety of manners. For instance, the system 100 can consider generation of plans for general "global" contextual features. For such cases, the route generator component 104 can generate plans from a predictive model or other model of context-dependent road speeds. In a specific example, directions can be output that cause a user to travel with guidance from a first set of directions if it is raining and a second set of directions if it is not raining. Additionally, the route generator component 104 and/or the branching component 108 can provide contingencies given different times of departure, such as directing a user over a first path if at a certain time of day while directing a user over a second path if it is a different time of day. For example, a contingency plan can be a list of directions with contingencies highlighted leading to a new set or subset or nested subset of directions, etc. This can also be accomplished visually, with a visual metaphor for calling out observation points (e.g., points where a user's perception of an observation point will aid the user in deciding whether to take a contingent path) and contingent branches.

Therefore, for instance, the system 100 can output key sets of routes for different key contexts, even when a user does not specify a particular context. For instance, if the user provides the route planning system 100 with a request for directions between two points without providing additional context, the route planning component 104 can perform a typical routing analysis globally (without specified context) and also run several searches considering key contextual features. For example, the route planning component 104 can utilize a Dijkstra and/or A* search algorithm or a variant thereof for performing several searches given different contexts or combinations of contexts. The system 100 can then be utilized to generate a default route, but can add automatically the option of taking one or more alternative routes of the journey is associated with certain context(s) or combinations thereof (time of day, day of week, weather, etc.). Still further, the searches can be guided by likelihoods (e.g., if it is likely to rain the route generator component 104 make exploration of routes dependent upon rain a high priority).

The system 100 is also capable of more sophisticated route generation that takes into consideration the possibility that a user taking a recommended route will be able to make real-time observations at different points during the trip, and such a consideration of the user making observations and then accessing different routes based on the observations, can be included into the route-generation procedure. These considerations can be layered upon that described above. For instance, the route generator component 104 and/or the branching component 108 can examine each road segment within a potential candidate route and can identify those road segments associated with high-variance in flow for specified contexts (or for all or a subset of contexts where there is no specification). This can be undertaken with respect to paths for which there could be a potential problem with slow or jammed traffic flow greater than some threshold probability, or, more generally, an issue with flow at that segment that would cause travel time through the segment or through the whole candidate route to be greater than some threshold time.

For each high-variance segment, the contingent-route generation analysis can consider whether the situation was observable and still recoverable. For cases where segments would become blocked, a branching component 108 can compute whether a driver would have an option of first observing a road segment and then taking rerouting action, wherein the segments that are associated with clear observational signs and feasible re-routing actions are noted. An example of such a branching point (e.g., a contingent branching point) can be a freeway segment where there is an exit soon after (under some number of miles and thus associated with a bounded time even when jammed) a high variance blocking segment that the user can exit the freeway. More general observations can be utilized as general evidence about likely flows in a remainder of a traffic system, particularly for the remainder of a default route, thereby leading to a re-route. For instance, a re-route may be directed if an observation is that traffic is relatively slow moving, fast moving, weather conditions, etc. Early observations, such as noting gentle slowing or speeding up of flows on a route can be linked by a probabilistic model to problems or fast flows downstream that could lead to routing decisions before encountering heavy backups.

Expected time of travel can be computed given various re-routing. For instance, for each contingent branching point, a route can be regenerated that assumes the segment after a rerouting point in the default route is not available, and the entire time is recomputed (including the time required to observe and re-route from the default path). For example, the re-routing speeds can use as input the fact that the first segment or other segments have been seen to be jammed or slow (or open, per where the contingent branching occurs). Upon searching through each candidate route, the optimal plans with contingencies can be selected. The expected value of a contingent path can be computed in a plurality of manners. In one example approach, expected driving time through the default path and each of the alternate routes can be computed. The driving time for each of the contingent (alternate) paths can then be computed.

An expected duration for a constellation of paths between locations, representing a route and all contingency plans associated with that route generated in request for assistance with navigation can be computed. A complete set of routes representing routes and all feasible contingencies associated with the route can be referred to as a contingent route constellation. The overall expected time (or similarly, overall expected route length or expected values of other objective functions that combine such quantities as length and time) for each contingent route constellation can be computed by considering the likelihood that a driver will take each route within the constellation in traveling between starting and ending locations.

This expected time is computed by considering the likelihoods that different values of findings will be observed at each point where observations are made which are linked to routing decisions. The likelihoods of observations at each such contingent branching point (e.g. traffic is seen to be heavy at contingent branching point x, and the contingent plan asserts that a user should thus exit the freeway at a certain exit and take a particular side street) can be provided, e.g., by a probabilistic traffic flow model, such as described herein. The likelihoods of observing or reporting different states of affairs when observations are made at the contingent branching points can be viewed as marginals or can be conditioned on the context at hand.

Given a set of likelihoods on the observations, the expected duration of the contingent route constellation is computed by summing over the travel times required for each of the end-to-end routes, weighted by the probability of each alternative path, as determined by the probabilities of making observations derived from the predictive model. The probability of each end-to-end route, p(route i taken|context), is computed as the likelihood of the conjunction of observations that would lead to each segment of that end-to-end route being taken. Given computed probabilities of each route, the overall expected duration of the contingent route constellation is expressed mathematically as:

$$\text{Expected Duration(Contingent route constellation } c) = \Sigma_{i \in c} \text{Time(Route } i) * p(\text{route } i \text{ taken}|\text{context})$$

where the likelihood of all feasible routes i (elements of the contingent route constellation c) are considered. The estimates of the time, for each end-to-end route i, Time(Route i), is computed as the sum of the expected time required to traverse each road segment of i, computed as the average velocity as measured or computed from models that provide the context-sensitive average velocities or probability distributions over velocities for each segment, given the context, and observations that led to route i being taken.
The feasible routes are defined as each specific distinct end-to-end route where each one has different contingent segments taken. The search for valuable contingent route constellations can be performed directly as part of a Dijkstra, A*, or other search algorithm computation (rather than sequentially as a modification to previously identified best default plans). Still further, a number of contingencies can be limited per driver preferences. For example, the generation of contingent route constellations can be limited to one or some small number of contingent branching points per candidate route recommendation, thus maintaining the degree of complexity and therefore maintaining the simplicity of expressing and using the contingent route constellation.

Figure 2:
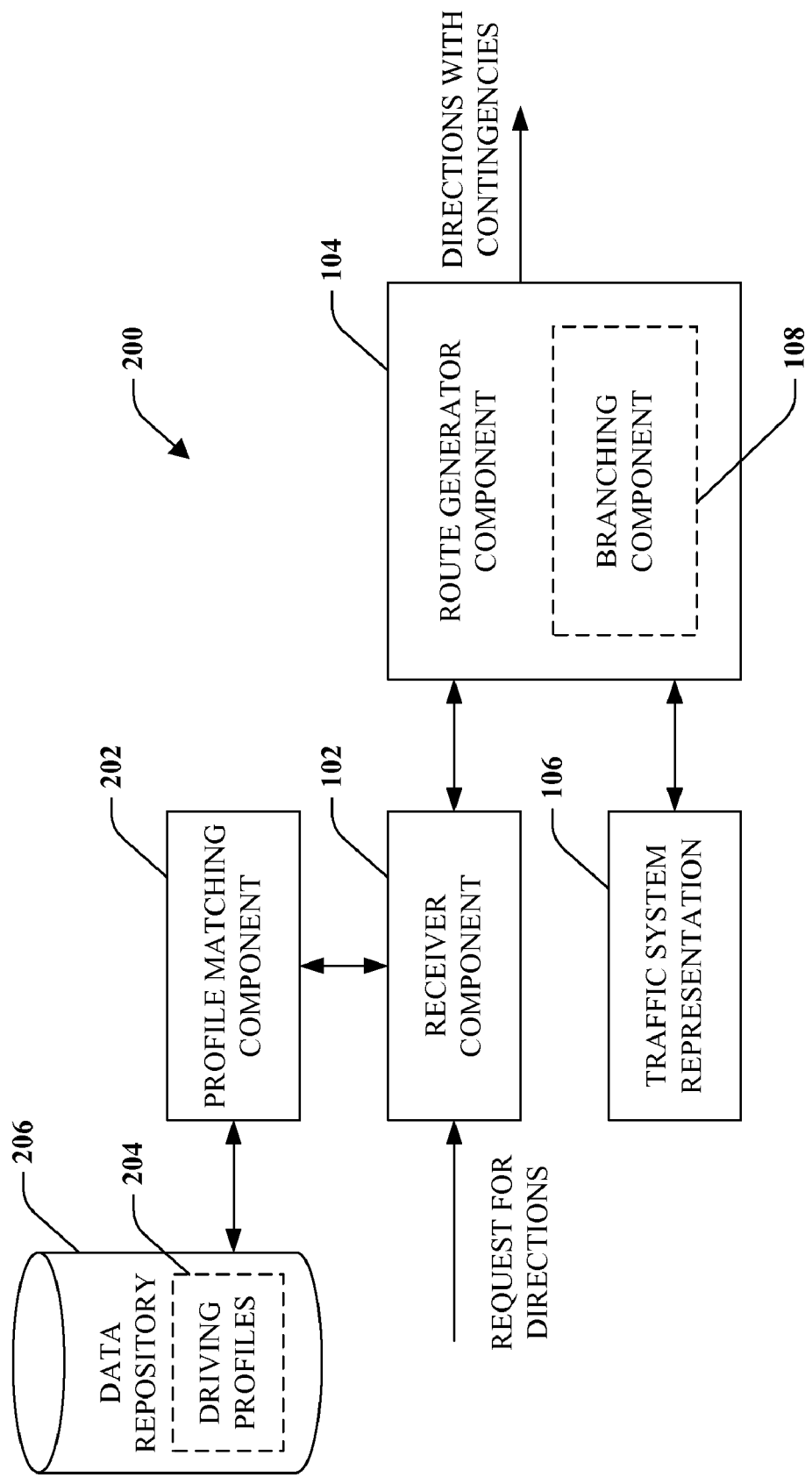
FIG. 2 is block diagram of a system that facilitates outputting of directions with contingencies based at least in part upon a driving profile assigned to a driver.

Now turning to FIG. 2, a route planning system 200 is illustrated. The system 200 includes the receiver component 102 that receives a request for directions between two points from a user. The receiver component 102 can be communicatively coupled to a profile matching component 202, which can analyze driving preferences associated with an initiator of the request and map the driver to one or more driving profiles 204 within a data repository 206. The matching of the driver to a profile can be accomplished through a variety of means. For instance, sensors can be associated with the driver's vehicle to enable tracking of the driver's preferred routes (e.g., scenic routes over highway routes), average speeds given posted speed limits and traffic congestion, and the like. Data accumulated from the sensors can be analyzed in connection with profiling the driver. In another example, the driver may have previously provided answers to a questionnaire that is utilized to profile the driver. Still further, demographic information associated with the driver can be utilized to assign one or more of the profiles 204 to the driver. Therefore, it is understood that any suitable manner of profiling the driver with respect to their driving preferences is contemplated.

The driving profiles 204 can include profiles that are based upon demographics, monitored driving preferences, and the like. For example, drivers at or near retirement age may not wish to travel over highways associated with a significant amount of traffic congestion, and will increase travel time to avoid such highways. Drivers in their twenties, however, may be more willing to travel over such highways to reduce travel time. Drivers' typical areas of driving can also be indicative of driving preferences, as individuals from small towns may be less likely to travel over busy roads proximate to a large city than those who typically drive in large cities. Thus, numerous profiles can be defined that map to how different users prefer to drive.

The receiver component 102 is communicatively coupled to the route generator component 104, which accesses the traffic system representation 106 based at least in part upon the received request for directions. As described above, the route generator component 104 can locate an optimal route given parameters associated with the request for direction. The branching component 108 can locate points within the route where it may be desirable to alter the route while still traveling to the destination point. The branching component 108 can select such points within the route based at least in part upon the user profile associated with the initiator of the request by the profile matching component 202. For instance, if the route generator component 104 determines that an optimal route involves merging on a highway at a merge that can be associated with large amounts of traffic congestion (as can be determined through analyzing the traffic system representation) and the user does not like to merge onto busy highways, a branch point can be provided that can enable avoidance of the merge. For example, the output directions can include directions such as "merge onto the freeway; if the freeway appears busy, skip the merge and continue east." The remainder of the directions through each portion of the branch will result in reaching the destination point.

To generate robust directions, the route generator component 104 can review and analyze contextual information (provided by the user, an external source, inferred, etc.). Such information can include month of year, season, whether a day is a holiday, weather conditions, road conditions, major events (such as sporting and/or cultural events), sensed traffic patterns (e.g., which may be sensed by a fixed sensing system, sensors from drivers, . . . ), dynamics of traffic flow (e.g., durations of time since particular regions of a traffic system have been reported to be blocked or freed from blockage), reports on any road of blockage or flow, natural language reports of accidents, events, closures, construction, etc., whether a major road has been blocked within a certain radius or road driving distance to a user, distance to a major road that has become blocked, distance to a road that has become blocked within some threshold time, road segments that are part of a bypass, conduit, or alternative routes (to arterial), within some distance or in a radius from a current, recent, or evolving arterial traffic flow problem. Such contextual information can be utilized in connection with updating/creating the traffic system representation 106 and/or outputting a route to a user (given a certain context). Moreover, certain information can be ignored if a user requests a route at a time distant in the future (as sensed conditions most likely will have changed).

The route planning component 104 can further contemplate a road type of a road in connection with generating a default route and/or a contingent route. Continuing with the above example, the route planning component 104 can determine if a road segment in a primary route or a contingent route is a two-lane or four lane road. Additionally, the route planning component 104 can analyze terrain of a region that includes a road segment as well as zoning information of the road segment, such as whether it is a commercial region, an agricultural region, residential region, etc. This information can be employed together with average road speeds of the road segment at similar contexts or separate from such average road speeds to estimate a road speed for a road segment given different contexts, and thus can be used to determine a primary route and/or contingency routes. Road types can include, for example, whether a road is a highway, a major road, an arterial road, a street, a ramp, a limited access highway, a ferry connection, etc. Other parameters that can be taken into account include posted speed, number of lanes, two way versus one way, public versus private, toll versus free, paved versus unpaved, physical divider between different directions or not, length of segment, incoming valence (number of streets coalescing into this road), outgoing valence (number of streets the segment branches into), intersections per mile, traffic lights and their density, whether a road segment is part of a typical "trouble spot" (e.g., where traffic jams often occur), flow of traffic at a segment having high variance versus low variance, etc.

Other factors can additionally be contemplated by the route generator component 104, such as proximal terrain surrounding a particular road segment, services nearby a road segment, whether a road segment is near transportation services, travel stops, automotive services, accommodations, shopping, ATMs, banks, emergency assistance centers, city centers, government facilities, educational facilities, business facilities, restaurants, grocery stores, restaurants, bars/nightclubs, recreational facilities, parks, and/or the like. Still further, the route generator component 104 can contemplate relationships between roads, such as geographic proximity to a road, distance from arterial system, distance to a highway on or off-ramp, whether a road a "conduit" to or from highway (e.g., a major road that can reach the highway or come from the highway by traversing a distance of less than a threshold), whether a road part of one or more "bypass" routes around a major road or arterial, whether a road is part of paths in side streets that route around arterial trouble spots (commonly blocked portion of arterial system), whether a road is part of one or more "alternate" routes (e.g., the road is a part of at least one path that serves as an alternate route to blocked highways), etc.

Figure 3:
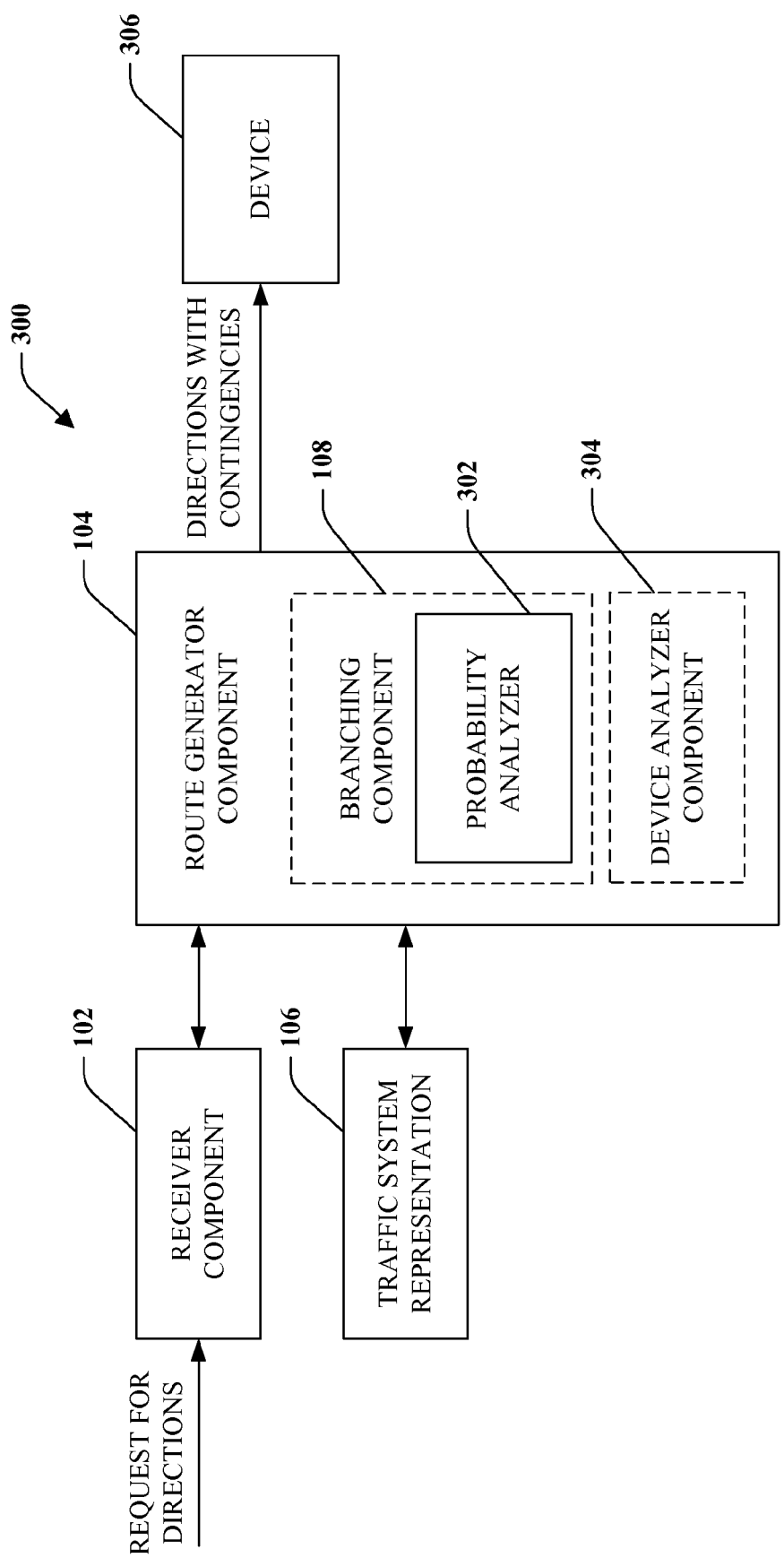
FIG. 3 is a block diagram of a system that determines a number of branch points within a route based upon an analysis of a device that will display directions.

Referring now to FIG. 3, a route planning system 300 is illustrated. The system 300 includes the receiver component 102 that receives a request for directions between a beginning point and a destination point. The request can further include parameters relating to context, such as when a journey will be undertaken (e.g., 9:00 a.m. on a Saturday). The route generator component 104 can receive such information from the receiver component 102, and can access the traffic system representation 106 based at least in part upon the received data. As described above, the traffic system representation 106 can be and/or include a weighted graph that enables typical/expected traffic flows to be represented given various contexts (e.g., times of day, days of week, events, weather conditions, . . . ). The traffic system representation 106 can also include data relating to accidents (such as historical data), location of stop signs and stop lights, and other suitable data.

The route generator component 104 can then determine directions between the points provided within the request for directions through analyzing the traffic system representation 106. For instance, the route generator component 104 can utilize an A star algorithm in connection with determining a route between the provided points. Further, the route generator component 104 can determine the route given user preferences (e.g., avoid highways).

The branching component 108 can be employed to create branches within the directions, such that a best route is contingent upon user perception while traveling. Thus, the branching component 108 enables the route generator component 104 to output several different routes between the same two points, wherein the user can select paths based upon their perceptions while traveling. To aid in determining which paths to provide to a user (where to place branches), the branching component 108 can include a probability analyzer 302 that aids in determining where branch points should be placed within a route. The probability analyzer 302 can determine probabilities relating to where within a route, for example, high levels of traffic congestion are most probable to unexpectedly occur. With more specificity, the probability analyzer 302 can locate points within the route where accidents are most probable to occur (given historical data and contextual data). The probability analyzer can further determine which routes are the next most probable as being the optimal route.

The route generator component 104 can also include a device analyzer component 304 that analyzes a device 306 to which the directions are to be delivered. For instance, the device analyzer component 304 can analyze display parameters associated with the device 306 (if the device 306 includes a graphical user interface), printer capabilities if the device 306 is a printer, etc. A number of branch points and how to display the directions to the driver can also be based at least in part upon the analysis of the device 306. For instance, a device with a small display may not be able to suitably display the number of branch points that a standard size piece of paper can display.

Figure 4:
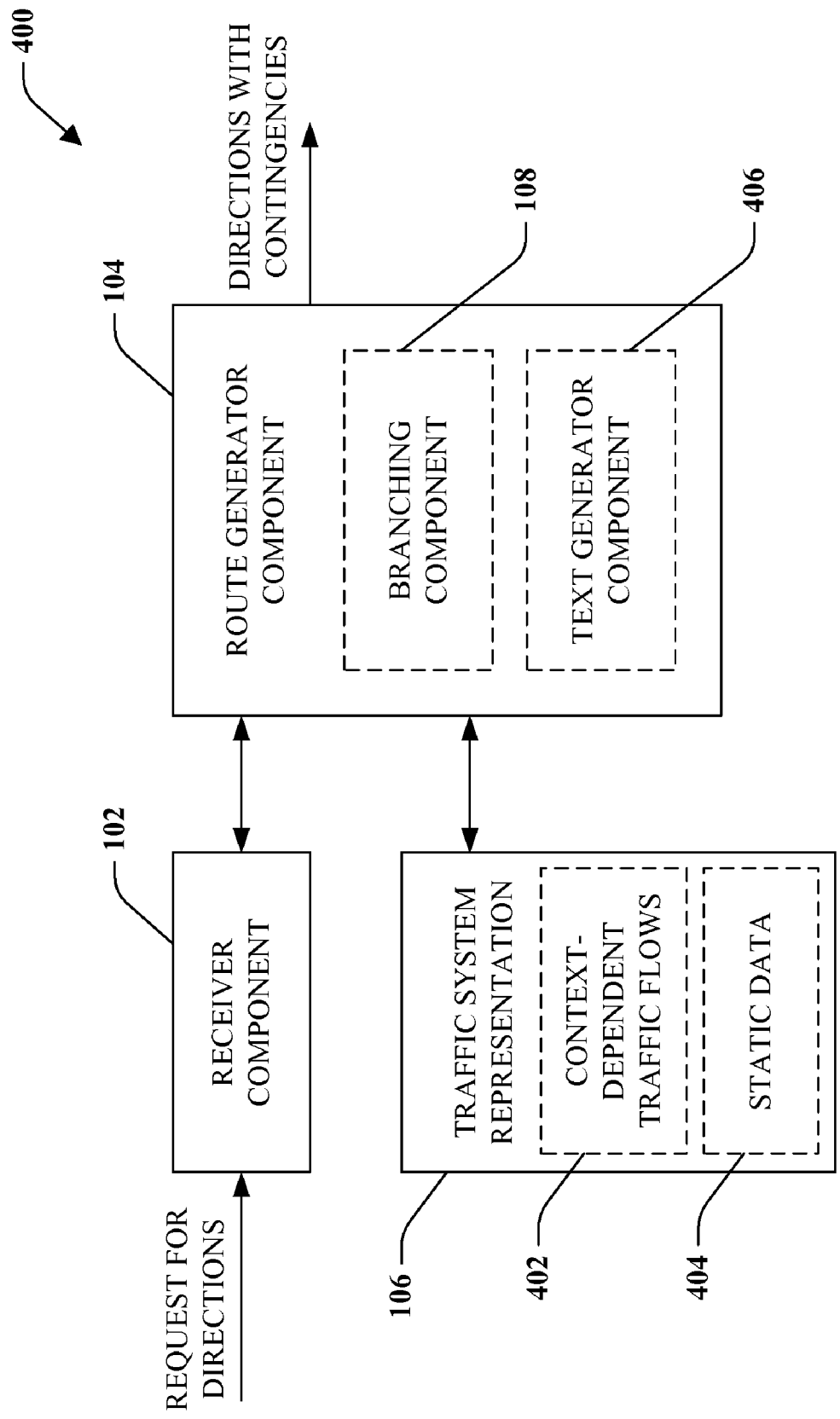
FIG. 4 is a block diagram of a system that facilitates outputting directions between two points, wherein the directions include at least one contingency.

Referring now to FIG. 4, a route planning system 400 that outputs contingency routes in connection with an optimal route is illustrated. The system 400 includes the receiver component 102 that receives a request for directions between two points. As described above, the request can be received over a network such as the Internet. In another example, the system 400 can reside within a client device, such that the request is provided to the system 400 (which can reside in memory) over an internal bus. The receiver component 102 can route the request for directions to the route generator component 104, which can in turn access the traffic system representation 106. The route generator component 104 can locate an optimal route or routes between the beginning point and ending point provided within the request for directions through an analysis of the traffic system representation 106.

The traffic system representation 106 can include context-dependent traffic flows 402, such that "real-world" traffic conditions within a traffic system are modeled by the traffic system representation 106. Pursuant to an example, commuters in a metropolitan region are cognizant of the differences in traffic flow of certain road segments inside and outside of rush hour. Similarly, weather conditions can drastically alter how traffic flows through particular intersections or over certain road segments. The context-dependent traffic flows 402 enable the traffic system representation 106 to accurately represent a traffic system as context changes. For instance, the context-dependent traffic flows 402 can be based at least in part upon a weighted graph, where nodes represent intersections and edges represent road segments between the intersections. The edges and/or nodes can be weighted as a function of average speed of vehicles that travel through or over the intersections and road segments given different contexts. Pursuant to one example, the weights can alter as time of day, day of week, and weather conditions alter. Furthermore, road segments and/or intersections not associated with sensed data can be assigned average travel speeds through analysis of collected data associated with other road segments/contexts.

The traffic system representation 106 can also include static data 404 that is utilized to represent static elements within a traffic system, such as location of stop signs, location of road segments and intersections, location of stop lights, road types, zoning areas associated with the road types, posted speed limits, terrain, and any other suitable data. Therefore, the traffic system representation 106 can be a robust representation of a traffic system 106. The route generator component 104 can determine a route between two points by searching through available routes and locating a route associated with a lowest weight (e.g., least amount of time). As described above, however, a best route at one point in time may not be a best route at a different point in time (or an accident or other occurrence can cause a best route to alter). Pursuant to one example, if the request for directions is not associated with contextual information (e.g., time of day and day of week), then the route generator component 104 can make a probabilistic or deterministic approach to locating an optimal route (e.g., automatically select a most probable context). The branching component 108 can thereafter be employed to provide branches off of the route determined by the route generator component 104, wherein such branches may be associated with next-most probable contexts. Pursuant to an example, the route generator component 104 can determine that most people asking for directions travel during rush hour on weekdays, and can create a route that is associated with a best route for rush hour. An alternative route (optimal during weekends or outside of rush hour) may not be identical to the most probable route. Accordingly, the branching component 108 can output a branch to a primary route that utilizes the second-most probable route.

The route generator component 104 can additionally include a text generator component 406 that creates text associated with one or more branch points. For instance, the text can be tailored to a driver's senses, such as sight. In a particular example, a branch point may be associated with a merge onto a freeway, wherein the traffic system representation 106 indicates that, at times, such merge can be associated with a significant amount of traffic. The text generator component 406 can utilize such information to output text at a branch point such as "if the freeway is backed up, do not enter the freeway and continue traveling east." Textual phrases output by the text generator component 406 can be selected from a plurality of predefined phrases. In another example, the text generator component 406 can utilize templates in connection with outputting text in connection with branch points in a provided route.

Figure 5:
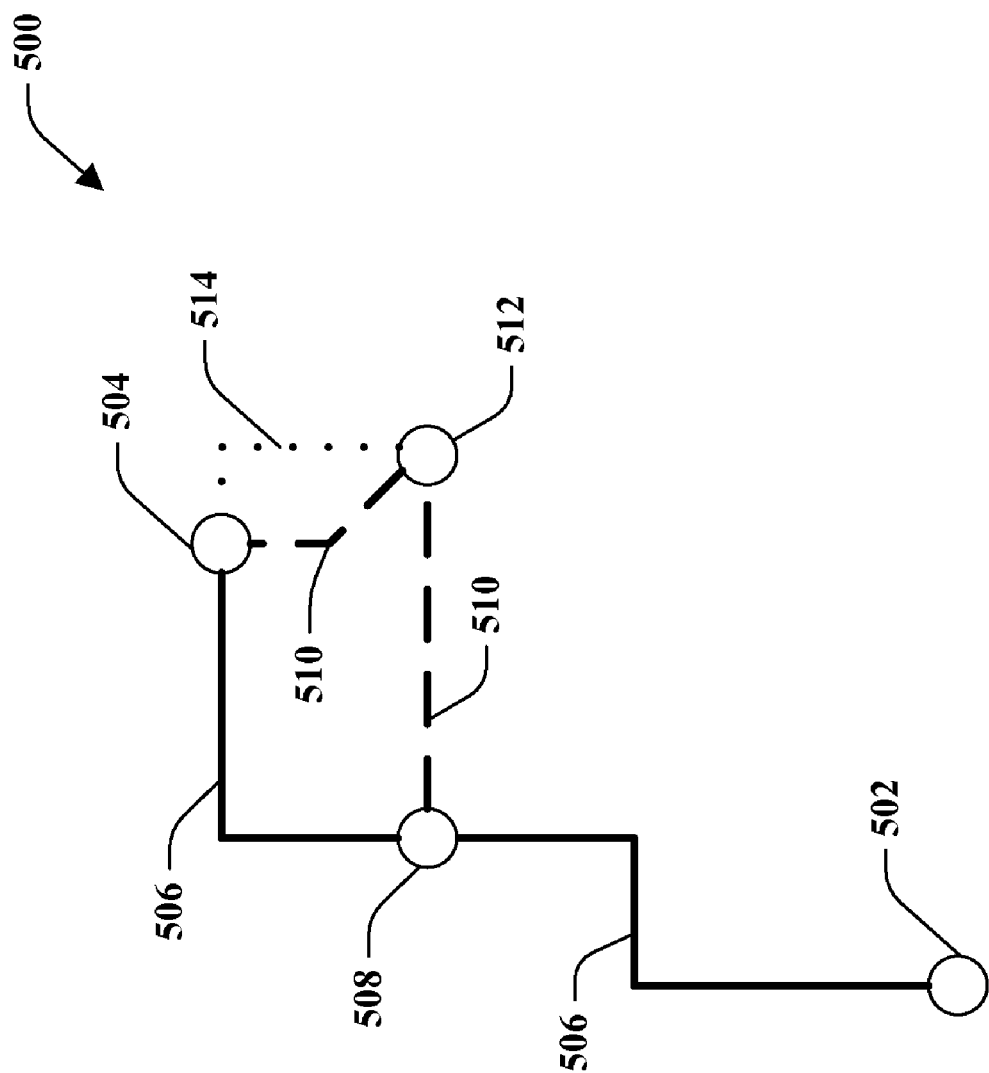
FIG. 5 illustrates an exemplary route that includes multiple branches.

Referring now to FIG. 5, an example branching of directions 500 between two points is illustrated. For instance, a user can request directions between a beginning point 502 and a destination point 504, and the route generator component 104 and the branching component 108 can output an optimal route and branches therefrom. For instance, the route generator component 106 can output a route 506 between the beginning point 502 and the end point 504. The branching component 108 can provide a branch point 508 within the route 506, such that a secondary route 510 is provided to the user. The branch point can be accompanied with text, such that a user can make a decision relating to which route to travel based upon perceptions at the branch point 508. Pursuant to an example, the route 506 can be along a freeway, and the branch point 508 can correspond to a particular exit off of the freeway. Text associated with the branch point 508 then can be "if there is a traffic jam on the freeway at the branch point 508, exit the freeway and take route 510. If there is no traffic jam on the freeway, continue with the route 506." Thus, the user acts as an on-road sensor so that they travel an optimal route.

As can be discerned from reviewing the example branching of routes 500, the route 506 and the route 510 each lead to the destination point 504. Pursuant to another example, the route 510 can be associated with a branch point 512. As before, the user can maintain travel over the route 510 or select to travel over another provided route 514. Example text associated with the branch point 512 may be something similar to the following: "At the branch point 512, if there is road construction associated with the route 510, take the route 514. Otherwise, continue traveling the route 510." Again, the user's perceptions while driving are taken into consideration. Such route branching may be especially beneficial for use with devices that are not always connected to a network or with traffic systems that are not associated with real-time sensors on roadways. Rather, the route generator component 104 and the branching component 108 can predict where along routes branches should be provided, and a number of branches can depend upon an output device, user preference, or any other suitable parameter.

Figure 6:
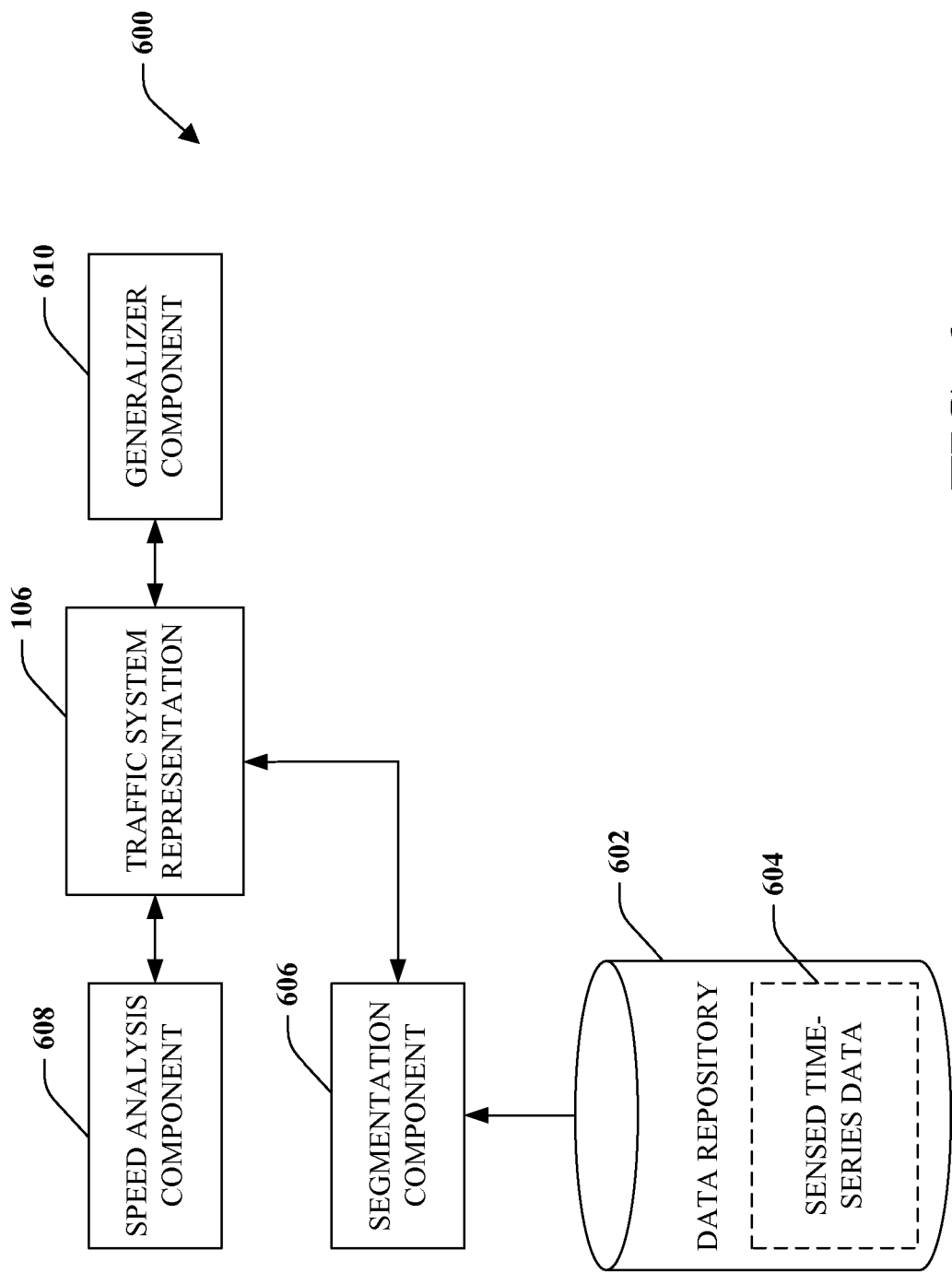
FIG. 6 is a block diagram of a system for building/refining a traffic system representation whose contents alter as context changes.

Referring now to FIG. 6, a system 600 for building a robust traffic system representation is illustrated. The system 600 includes a data repository 602 that includes sensed time-series data 604, wherein such data can be collected from a plurality of drivers as they travel through a traffic system. For example, the sensed time-series data 604 can be obtained by associating location/velocity-determining sensors (such as GPS receivers) with a plurality of drivers in a traffic system (e.g., a metropolitan traffic system). As data is generated from the sensors, such data can be associated with time-stamps. Thus, trace logs for each respective driver associated with the location-determining sensor(s) are generated and can be placed within the sensed time-series data 604. Additionally, the sensors can be configured to record/output data only when a vehicle is in motion, and can automatically cease recording/outputting after the vehicle is immobile for a threshold time and/or when the vehicle is shut off. The sensors can again record/generate data when the vehicle associated therewith begins to travel. A segmentation component 606 can be employed to discern when individual journeys stop and start. As sensors associated with automobiles stop recording when the automobiles stop moving for a threshold amount of time, most (but not all) individual journeys taken by the drivers can be identified by the segmentation component 606 through reviewing time gaps that appear in the sensor logs.

Some situations exist, however, where it may not be easy to discern where a journey started and stopped. For example, a driver may stop for a short period of time to drop off a passenger. To locate such situations, for instance, the segmentation component 606 can analyze logs within the sensed time-series data to determine when a loop has been made (e.g., from location A to location B to location A). If the segmentation component 606 detects a loop, then a segmentation point can be chosen at a point in the loop that is physically furthest from where the loop closes.

The traffic system representation 106 can be built/defined based at least in part upon the sensed time-series data 604, and can be or include a graph, where nodes in the graph represent intersection of roads and edges represent road segments. A single road may be represented by multiple edges, as each road segment (the smallest unbroken portion of a road between two intersections) can be a separate edge in the graph. Additionally, the edges and nodes can be associated with latitudes and longitudes of roads that they represent. Once the sensed time-series data 604 has been segmented into individual journeys, such journeys can be associated with the traffic system representation 106. This may be problematic in that, for example, noise can be associated with GPS signals. Additionally, the traffic system representation 106 may be imperfect; for instance, two different maps may pinpoint a particular latitude/longitude position at slightly different locations relative to surrounding features in each representation. Various methods are contemplated for effectively associating sensed data with the traffic system representation 106.

Once the trace logs are associated with road segments, a speed analysis component 608 can associate different weights to edges/nodes within the graph of the traffic system representation 106 over different times. For example, the speed analysis component 608 can learn time-dependent traffic speed for roads by breaking days of the week into multiple categories and breaking such categories into several time slices. For purposes of illustration, it can be assumed that the speed analysis component 608 breaks the days of the week into two categories: weekdays and weekends. Such categories can then be broken into 96 time slices: 15-minute blocks of time covering 24 hours of the day. It is understood, however, that the speed analysis component 608 can create categories associated with any sort of contextual data. For instance, the speed analysis component 610 can create categories based upon weather conditions, holidays, and the like.

Continuing with the above example, the speed analysis component 608 can learn a separate average speed for each time-of-day and weekday/weekend breakdown by examining each pair (A, B) of consecutive GPS points in snapped traces. The average speed of a driver between each pair can be calculated, and the speed can be utilized to create a running average for every road segment traversed to get from A to B. Speed measurements can be applied to the running average associated with a block of time whose time characteristics match those of timestamps of collected data involved in the speed calculation. Thus, the speed analysis component 608 can determine speeds associated with road segments in various categories (time of day, day of week, . . . ). The speed analysis component 608 can then associate such data with the traffic system representation 106, such that edges and nodes are weighted based upon the collected data.

It can be discerned, however, that it may be impossible to obtain data for every road in a traffic system over every category. Thus, road speeds can be generalized given known road speeds of "similar" road segments. In more detail, a generalizer component 610 can analyze the traffic system representation 106 and provide speed values to road segments that are not associated with collected data for each category. For instance, for road segments and time segments where no data is available, the generalizer component 610 can assign the speed that is associated with the same road segment at an adjacent time block. If there is no speed associated with an adjacent time block, the generalizer component 610 can assign the segment a speed from a similar road and/or a system-wide average of speeds from similar roads, where similarity can be defined by road class within the traffic system representation 106. Additionally, similarity can be determined by analyzing speed limits, geographic proximity of road segments, geographic location of road segments, and the like. Still further, if similar roads cannot be located and/or if a system-wide speed average is unavailable, the speed for a time segment can be defined as the posted speed limit. Moreover, the generalizer component 610 can utilize machine-learning techniques/systems to learn patterns/correlations within the traffic system representation 106 and assign average road speeds to road segments based at least in part upon learned patterns, correlations, and/or trends.

Referring now to FIGS. 7-10, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
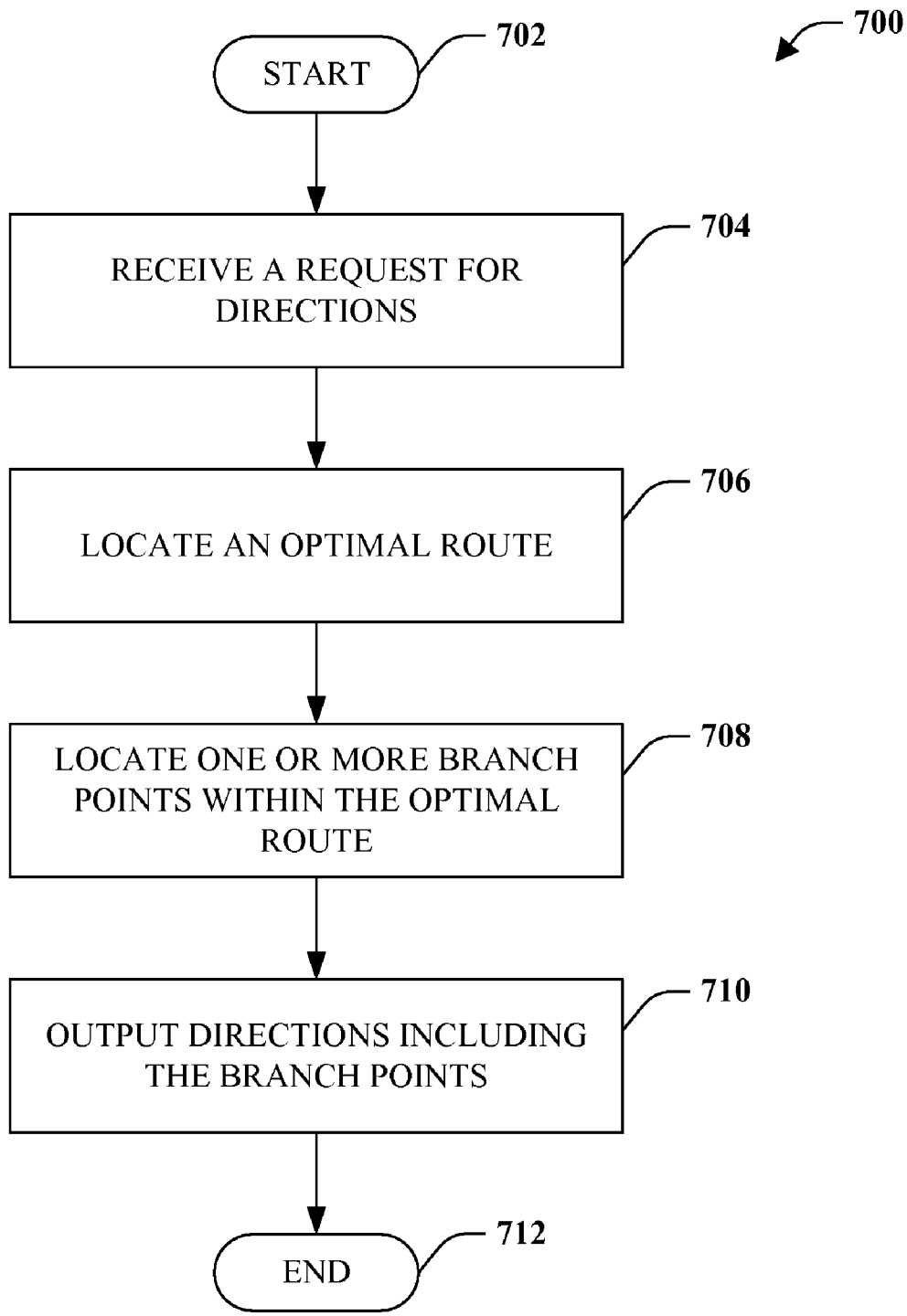
FIG. 7 is a representative flow diagram of a methodology for outputting directions that include multiple branch points.

Referring specifically to FIG. 7, a methodology 700 for outputting directions that include branch points is illustrated. The methodology 700 starts at 702, and at 704 a request for directions is received. As stated above, the request can be received over a network such as the Internet, over an internal bus of a portable computing device, or the like. Additionally, the request includes at least two locations: a point of beginning of a journey and an endpoint of a journey. The request for directions, however, can include several other points, which can be in a defined order of travel or an undefined order of travel. In other words, a route planning application can automatically inform a requesting entity of a sequence that the intermediary locations should be visited (besides the beginning and end point of travel).

At 706, an optimal route is located. For example, a traffic system representation can be accessed, wherein the representation includes representations of road segments and intersections. Furthermore, the representations of road segments and intersections can be weighted to reflect an average rate of travel over the road segments and intersections (and thus an average amount of time typically required to travel over such segments). The weights can alter as context alters, thereby accurately and robustly modeling traffic flow within a traffic system. Given a particular context, an optimal route can be determined by analyzing weights with respect to possible routes between the beginning point and an end point. For instance, a lowest total weight between the beginning point and end point can be indicative of an optimal route.

At 708, one or more branch points within the optimal route are located. The number of branch points can be determined by a user, can be based at least in part upon how the directions will be displayed, etc. The branch points can be discerned by locating points where accidents frequently occur, where there typically is a large amount of traffic congestion, etc. In another example, branch points can be pre-defined. At 710, directions are output that include the branch points. The directions can be textual and/or graphical in nature. For instance, graphical directions can be color-coded such that a primary route is in a first color and branches from such route are displayed in different colors. Additionally or alternatively, text can be provided, such as "If the freeway is congested, exit the freeway at exit 200. If the freeway is not congested, continue traveling along the freeway." The methodology 700 then completes at 712.

Figure 8:
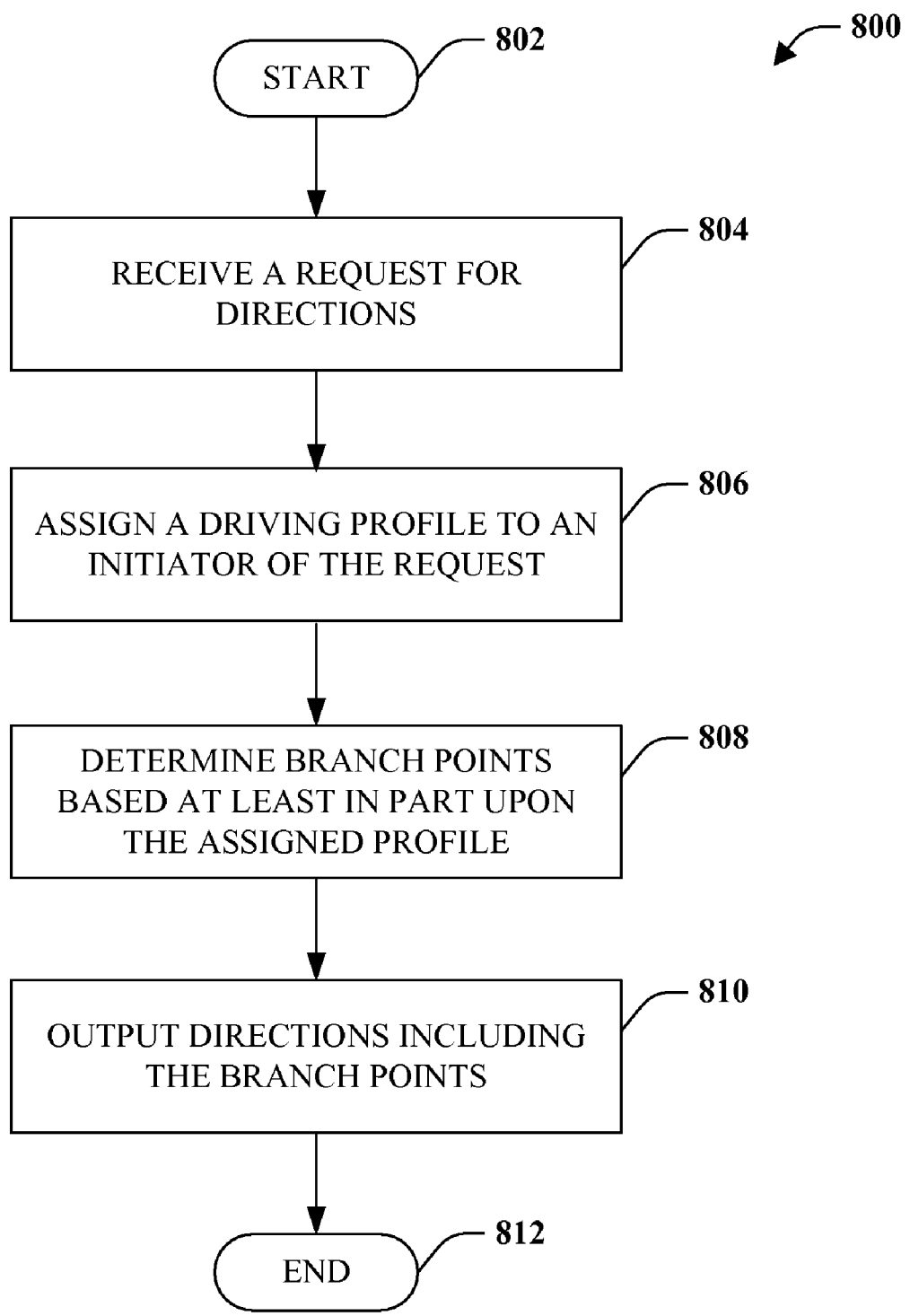
FIG. 8 is a representative flow diagram of a methodology for outputting directions that include branch points, the location of the branch points is based at least in part upon a driving profile.

Now referring to FIG. 8, a methodology 800 for outputting directions with contingencies to a user is illustrated. The methodology 800 starts at 802, and at 804 a request for directions is received. At 806, a driving profile is assigned to an initiator of the request. This profile can be assigned based upon collected driving data associated with the user (e.g., from GPS receivers, speedometers, accelerometers, explicit data received from the user relating to his/her driving preferences, or any other suitable data where driving preferences are explicitly provided. Additionally or alternatively, the driving profile can be assigned to the user based at least in part upon inferring driving preferences given demographic information relating to the user, travel history, and other suitable data.

At 808, branch points are determined within a route based at least in part upon the assigned profile. Pursuant to one example, a driving profile may represent drivers who are willing to extend their travel time to avoid busy highway merges. If the merges are not associated with a large amount of traffic congestion, however, the driving profile does not affect an optimal route. As described above, directions that are output in accordance with the claimed subject matter can vary depending upon context. For instance, directions output with respect to a first time of day can be different from directions output at a second time of day. This enables, for example, directions to be output that cause a driver to merge on a portion of freeway that is sometimes busy, but is not expected to be busy given the time of day. However, as the portion of the freeway is sometimes busy, and the user dislikes merging onto busy portions of the freeway, the merge point may be selected as a branch point. At 810, the directions are output that include the branch points. Continuing with the above example, directions can be output to the user that enable avoidance of the merge if the user perceives that the freeway is busy. The methodology 800 then completes at 812.

Figure 9:
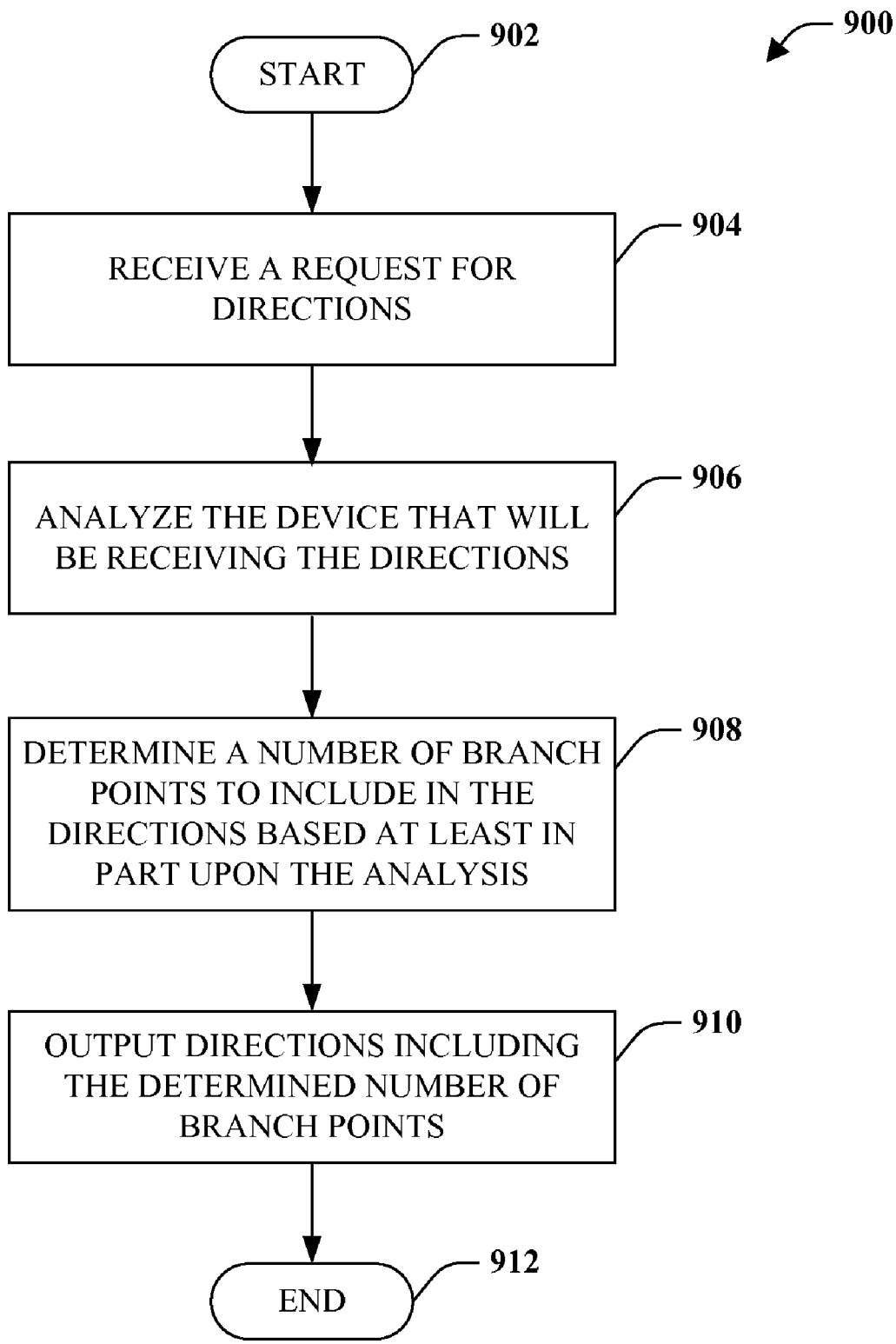
FIG. 9 is a representative flow diagram of a methodology for outputting directions with multiple branch points, wherein the number of branch points is based upon the device that is provided the directions.

Referring now to FIG. 9, a methodology 900 for outputting directions that include one or more contingencies is illustrated. In accordance with one aspect, the contingencies can be based at least in part upon inferences relating to traffic flows at particular times of a day. The methodology 900 starts at 902, and at 904 a request for directions is received. As described above, the request for directions can include a beginning point and end point. At 906, a device that will be receiving the directions is analyzed. The analysis can include an analysis of a size of a display region of the device, resolution of the display region associated with the device, and the like. At 908, a number of branch points to include in directions is determined based at least in part upon the analysis undertaken at 906. Pursuant to an example, a cellular phone with a small display region and low resolution may not be able to display as many branch points within directions as a standard sized piece of paper output from a printer. At 910, directions are output, wherein the directions include the determined number of branch points. The methodology 900 then completes at 912.

Figure 10:
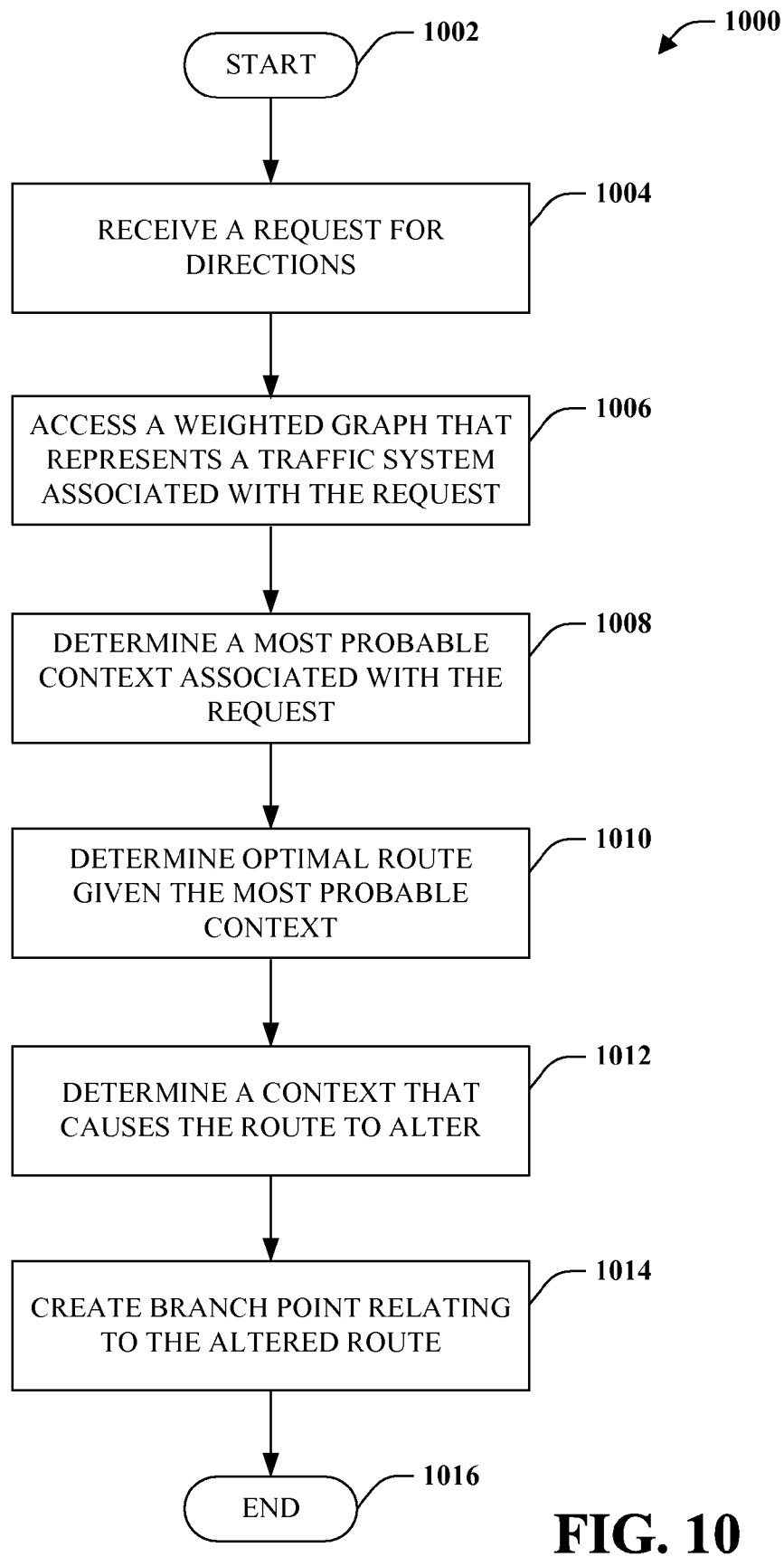
FIG. 10 is a representative flow diagram of a methodology for creating a branch point through comparing different routes between the same two points.

Turning now to FIG. 10, a methodology 1000 for creating a branch point or point of contingency in directions for a route is illustrated. The methodology 1000 starts at 1002, and at 1004 a request for directions is received. At 1006, a weighted graph that represents a traffic system associated with the request is analyzed. Pursuant to an example, the weighted graph can include nodes that represent intersections, edges that represent road segments between the intersections, and the weights can be indicative of average travel speeds associated with road segments and/or intersections. Furthermore, the weights can change as a function of context. For instance, a road segment can have a first weight at 8:00 a.m. on a weekday and a second weight at midnight on a Saturday. The weights can also be a function of weather conditions, occurrences of sporting events or concerts in a region, and the like.

At 1008, a most probable context associated with the request is determined. In one example, the most probable context can be determined explicitly. In other words, the initiator of the request can, within the request, indicate context associated with the journey (e.g., time of day and day of week that the journey will start). Additionally or alternatively, weather forecasts can be accessed to determine most probable weather conditions associated with the journey. In another example, contextual data can be inferred, such as what time is the most probable time that the user will start the journey. The inference can be based upon historical driving data of the user and/or driving data associated with the route.

At 1010, an optimal route is determined based at least in part upon the most probable context. As described above, weights of the weighted graph can alter as context alters. Thus, an optimal route (least time consuming while according to provided user preferences) given a first context may not be an optimal route given a second context. At 1012, a context that is related to the most probable context is analyzed, wherein such context causes the optimal route to be different than the optimal route determined at 1010. For instance, the context determined at 1012 can be associated with the driver beginning the journey an hour after the most probable departure time. As commuters in metropolitan regions understand, however, difference of an hour when leaving for work can result in major differences in traffic flow over particular road segments. At 1014, a branch point is created with respect to where the optimal route determined at 1010 and the optimal route with respect to the related context (determined at 1012) differ. Pursuant to one example, the optimal route determined at 1010 can cause a user to travel along a freeway for a majority of the journey. If the context is that determined at 1012, however, the optimal route will depart the freeway midway through the journey (due to expected high traffic congestion). Therefore, the branch point can be created to direct the user based upon the user's perceptions at or before the branch point. The methodology 1000 then completes at 1016.

Figure 11:
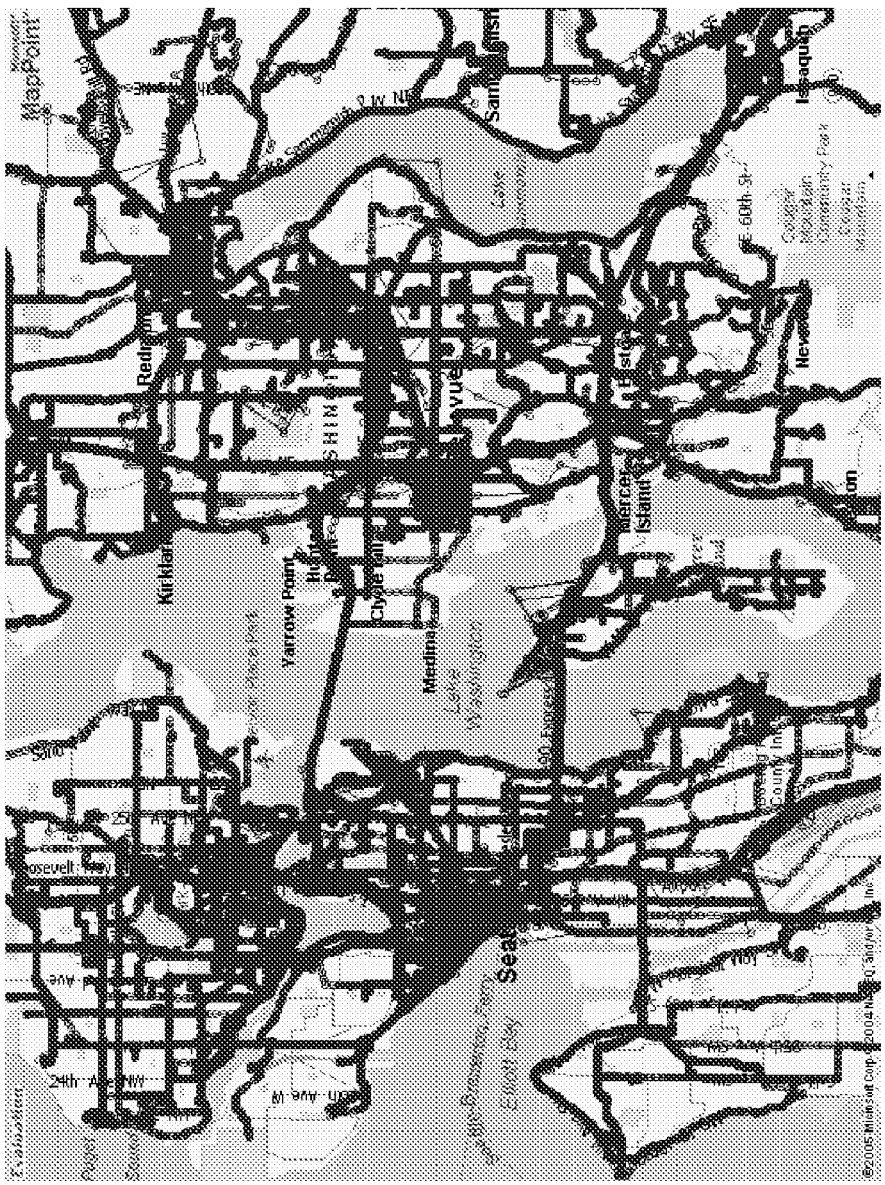
FIGS. 11 and 12 are screenshots illustrating collection of traffic data from automobiles in a traffic system.
Figure 12:
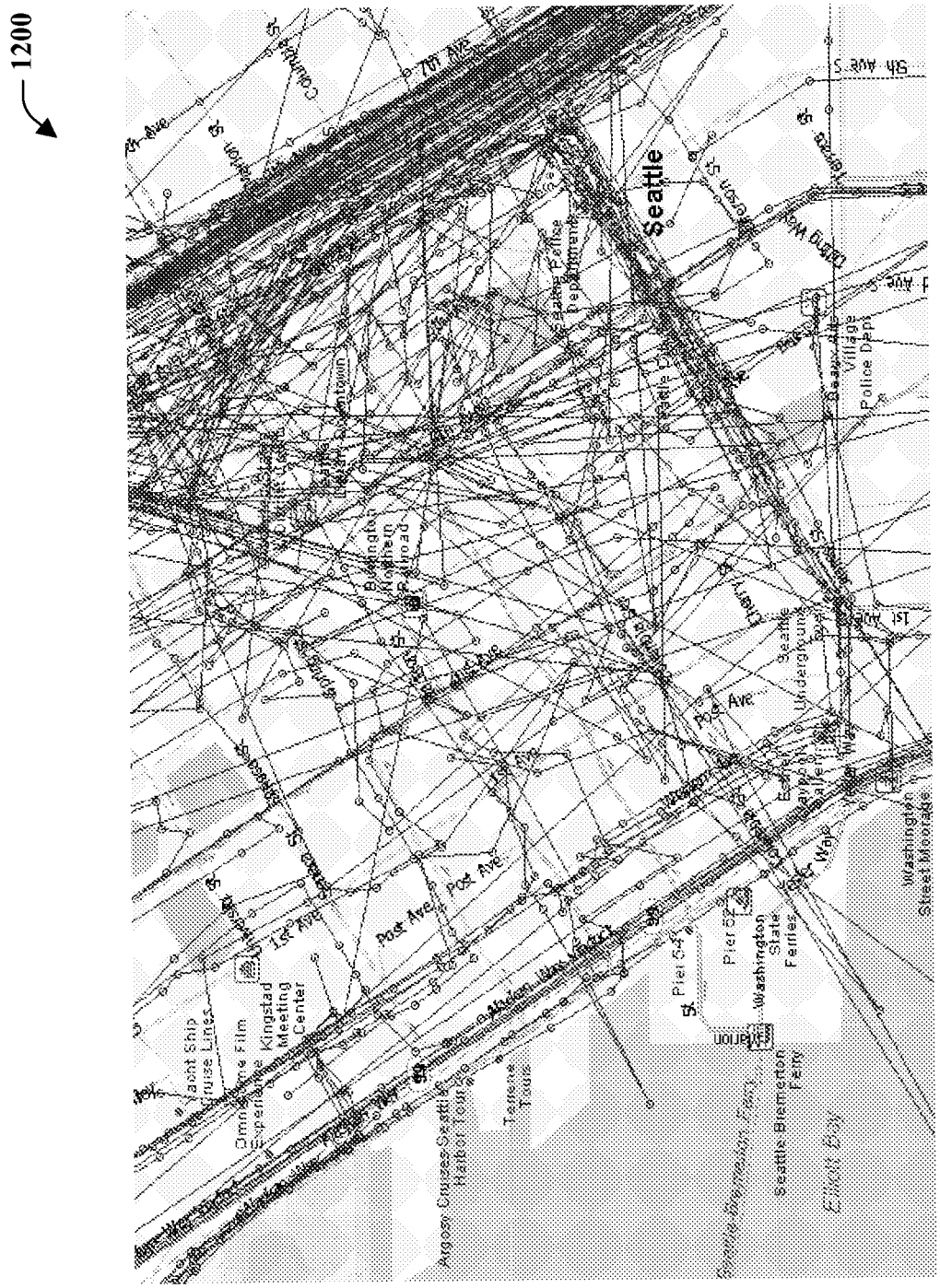

Referring collectively to FIGS. 11 and 12, screenshots 1100 and 1200 of a map overlaid with data points associated with location-sensors in automobiles is illustrated. The screenshot 1100 shows a high-level view of a metropolitan area where data has been collected, and the screenshot 1200 includes a more detailed illustration of collected data points overlaying a map. These data points can be associated with a plurality of different drivers over time. It can also be discerned upon viewing the screenshot 1200 that the data points often do not map to roadways, even though most of such data points were taken from vehicles on such roadways. Therefore, it is important to carefully "snap" these data points to roadways to enable creation of a robust traffic flow representation over different contexts. In one example, a Hidden Markov Model can be utilized in connection with snapping data points to associated road segments.

Figure 13:
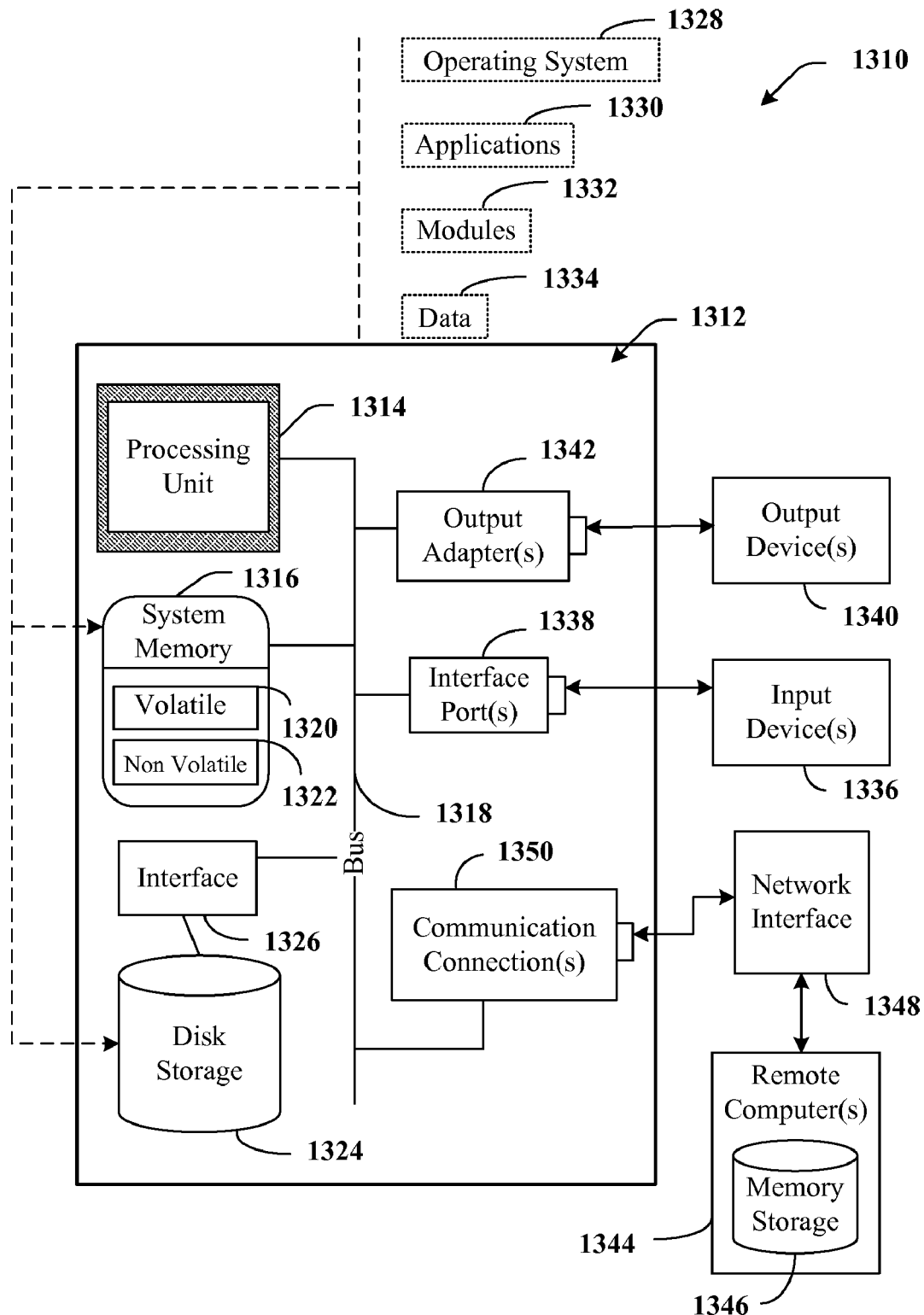
FIG. 13 is a schematic block diagram illustrating a suitable operating environment.

In order to provide additional context for various aspects of the claimed subject matter, FIG. 13 and the following discussion are intended to provide a brief, general description of a suitable operating environment 1310 in which various aspects may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the features described herein. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 that can be employed in connection with determining where to place branch points or contingencies within a route and outputting such branch points to a user includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, remote control, and the like. As described above, advertisements can be provided to a user upon receipt of user input. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
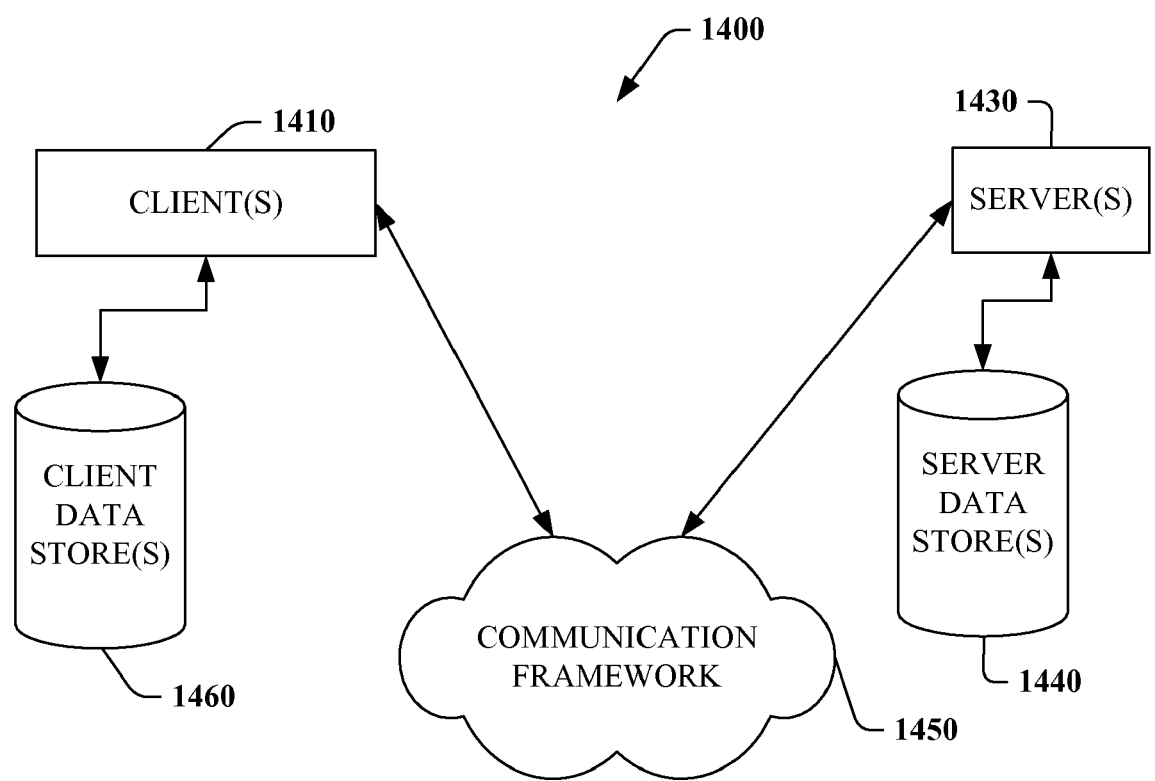
FIG. 14 is a schematic block diagram of a sample-computing environment.

FIG. 14 is a schematic block diagram of a sample-computing environment 1400 with which the claimed subject matter can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the claimed subject matter, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the server(s) 1430. In one particular example, the server(s) can include a route planning system that is accessible to a client by way of a network. Users can request driving directions from the route planning system by submitting a request to the route planning system within the server by way of the client and the network, and the route planning system can then output resultant driving directions to the client. The output driving directions can include contingencies that employ user perceptions at or before branch points.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A route planning system comprising the following computer-executable components:
   a receiver component configured to receive a request for driving directions between two or more points; and
   a route generator component that outputs driving directions of an optimal route between the two or more points, the driving directions including:
      directions between the two or more points along the optimal route;
      a contingency comprising:
         a contingent branch route;
         information specifying an observation point visible to a user driving along the optimal route; and
         a traffic condition at the observation point under which the contingent branch route is recommended;
   wherein:
      the route generator component determines the contingent branch route as a function of information about a previously observed flow of traffic with respect to at least one road segment within the driving directions; and
      the route generator outputs the driving directions in a format configured for presentation to a human with the contingency integrated with the optimal route.

2. The route planning system of claim 1, wherein:
   the information about the flow of traffic is in a form of at least one of a probability distribution of observed velocity statistics, a variance of observed velocity statistics, a standard deviation of observed velocity statistics, an upper bound on observed velocity statistics, and a lower bound on observed velocity statistics; and
   the route generator component provides a contingency in a region selected based on a degree of variation in the selected region.

3. The route planning system of claim 1, the route generator component comprises a branching component configured to determine where to place the contingency as a function of the information about the flow of traffic.

4. The route planning system of claim 3, the branching component is configured to determine where to place one or more contingencies by performing multiple searches over one of a database and a predictive model that describes flows within a traffic system with respect to at least one of a particular context and a combination of contexts.

5. The route planning system of claim 4, the database comprises a weighted graph, where nodes represent intersections, edges represent road segments, and weights associated therewith are a function of a probability distribution of one of observed and inferred speed of road segments and intersections represented within the database, the weights alter as time of day alters.

6. The route planning system of claim 3, the branching component is configured to generate one or more candidate contingent routes based upon an average flow for one or more specified contexts.

7. The route planning system of claim 6, the branching component is configured to determine a candidate contingent route based upon risk preferences provided by a user.

8. The route planning system of claim 1, further comprising a profile matching component configured to assign an initiator of the request for directions with a driving profile, the directions are output as a function of the assigned profile.

9. The route planning system of claim 1, further comprising a branching component configured to place multiple contingencies within the directions to provide multiple alternate routes, a selected route is dependent upon user perceptions at one or more geographic location that corresponds to at least one of the contingencies, the number of contingencies in the multiple contingencies being limited based on user input of a maximum number of contingencies.

10. The route planning system of claim 1, the route generator component is configured to utilize search methods to generate one or more contingent route constellations that provide assistance with travel between the two or more points based upon a consideration of overall expected duration of the one or more contingent route constellations.

11. The route planning system of claim 1, further comprising a branching component configured to determine where to place one or more contingencies as a function of one or more of cost, difficulty, or reliability of evaluating an observation point at a possible contingency point.

12. The system of claim 1, wherein:
the route generator component is configured to determine a first route given a first context and a second route given a second context, and
a location of the contingency within the directions results from a comparison of the first and second routes.

13. A route planning system comprising the following computer-executable components:
a receiver component configured to determine a request for driving directions between two or more points;
a profile matching component configured to assign an initiator of the request for directions with a driving profile;
a route generator component configured to output directions of an initial route containing one or more contingent branch routes between the two or more points as a function of the driving profile assigned by the profile matching component and, for each of the contingent branch routes, a condition at an observation point under which the contingent branch route is to be taken; and
a branching component configured to determine where within the initial route to place the one or more contingent branch routes by identifying regions from previously collected statistics, the previously collected statistics comprising traffic flow information of at least one road segment within the initial route, the one or more contingent branch routes comprising a number of contingent branch routes determined based on the assigned driver profile for the initiator.

14. The route planning system of claim 13, the route generator component is configured to utilize a traffic system representation in connection with outputting the initial route, wherein the traffic system representation is context-dependent and represents a traffic system associated with the request for directions, and wherein the traffic system representation changes as the context changes.

15. The route planning system of claim 13, the branching component is configured to determine where within the initial route to place the one or more contingent branch routes such that a selected route is dependent upon user perceptions at one or more geographic locations that correspond to on observation point of at least one of the one or more contingent branch routes.

16. The route planning system of claim 13, the route generator component is configured to utilize search methods to generate one or more contingent route constellations that provide assistance with travel between the two or more points based upon a consideration of overall expected duration of the one or more contingent route constellations.

17. The route planning system of claim 13, the profile matching component is configured to assign the initiator of the request with a driving profile as a function of demographics, monitored driving preferences, or responses to previously answered questions.

18. A route planning system comprising at least one processor and the following computer-executable components, executing on the processor:
a receiver component configured to receive a request for driving directions between two or more points; and
a route generator component configured to output directions of an initial route between the two or more points, the driving directions including:
directions between the two or more points along the initial route;
a contingency comprising:
a contingent branch route;
information specifying an observation point along the initial route; and
a condition at the observation point under which the contingent branch route is recommended, the condition being represented in the directions as one or more textual phrases,
wherein the route generator component determines the observation point based on historical data.

19. The route planning system of claim 13, wherein the traffic flow information is in the form of a probability distribution of observed velocity statistics associated with the at least one road segment within the initial route.

20. The route planning system of claim 1, wherein the route generator outputs the driving directions to a portable electronic device.

* * * * *